United States Patent
Ishida et al.

(10) Patent No.: US 11,289,705 B2
(45) Date of Patent: Mar. 29, 2022

(54) DISPERSANT FOR CARBON MATERIAL, DISPERSION CONTAINING DISPERSANT FOR CARBON MATERIAL, ELECTRODE SLURRY FOR ALL-SOLID LITHIUM-ION SECONDARY BATTERY, MANUFACTURING METHOD FOR ELECTRODE FOR ALL-SOLID LITHIUM-ION SECONDARY BATTERY, ELECTRODE FOR ALL-SOLID LITHIUM-ION SECONDARY BATTERY, AND ALL-SOLID LITHIUM-ION SECONDARY BATTERY

(71) Applicant: SANYO CHEMICAL INDUSTRIES, LTD., Kyoto (JP)

(72) Inventors: Tomonobu Ishida, Kyoto (JP); Koichi Mori, Kyoto (JP); Kohei Yamamoto, Kyoto (JP)

(73) Assignee: SANYO CHEMICAL INDUSTRIES, LTD., Kyoto (JP)

( * ) Notice: Subject to any disclaimer, the term of this patent is extended or adjusted under 35 U.S.C. 154(b) by 0 days.

(21) Appl. No.: 16/641,332

(22) PCT Filed: Aug. 24, 2018

(86) PCT No.: PCT/JP2018/031403
§ 371 (c)(1),
(2) Date: Feb. 24, 2020

(87) PCT Pub. No.: WO2019/044716
PCT Pub. Date: Mar. 7, 2019

(65) Prior Publication Data
US 2020/0295371 A1    Sep. 17, 2020

(30) Foreign Application Priority Data
Aug. 31, 2017    (JP) .............................. JP2017-166725

(51) Int. Cl.
| | |
|---|---|
| H01M 4/62 | (2006.01) |
| C01B 32/174 | (2017.01) |
| C01B 32/21 | (2017.01) |
| C08F 220/18 | (2006.01) |
| C09C 1/56 | (2006.01) |
| H01M 4/139 | (2010.01) |
| H01M 10/0525 | (2010.01) |

(52) U.S. Cl.
CPC ............. *H01M 4/62* (2013.01); *C01B 32/174* (2017.08); *C01B 32/21* (2017.08); *C08F 220/1818* (2020.02); *C09C 1/56* (2013.01); *H01M 4/139* (2013.01); *H01M 10/0525* (2013.01); *C01B 2202/22* (2013.01); *C01P 2006/40* (2013.01); *C08F 2800/20* (2013.01)

(58) Field of Classification Search
CPC ........ H01M 4/62; H01M 4/139; H01M 4/625; C09C 1/56; C08F 220/1818; C01B 2202/22
USPC .......................... 252/500, 510, 511; 429/322
See application file for complete search history.

(56) References Cited

U.S. PATENT DOCUMENTS

| | | | | |
|---|---|---|---|---|
| 5,445,743 A | * | 8/1995 | Rowe ........................ | C02F 5/12 210/701 |
| 2009/0155547 A1 | * | 6/2009 | Uozumi ................. | C09D 11/36 428/195.1 |
| 2017/0141400 A1 | * | 5/2017 | Tsukamoto .......... | C09D 133/12 |
| 2018/0090748 A1 | | 3/2018 | Mochizuki et al. | |

FOREIGN PATENT DOCUMENTS

| | | | |
|---|---|---|---|
| JP | 2787417 B2 * | 8/1998 | ......... C10M 169/04 |
| JP | 2011-70908 | 4/2011 | |
| JP | 2012-178327 | 9/2012 | |
| JP | 2014-93263 | 5/2014 | |
| JP | 2016-21390 | 2/2016 | |
| JP | 2016-212990 | 12/2016 | |
| WO | 2012/063827 | 5/2012 | |
| WO | 2014/088070 | 6/2014 | |
| WO | 2016/194759 | 12/2016 | |

OTHER PUBLICATIONS

International Search Report dated Nov. 13, 2018 in International (PCT) Application No. PCT/JP2018/031403.

* cited by examiner

*Primary Examiner* — Tri V Nguyen
(74) *Attorney, Agent, or Firm* — Wenderoth, Lind & Ponack, L.L.P.

(57) ABSTRACT

The present invention provides a dispersant for carbon materials, the dispersant containing a copolymer having a nitrogen-containing group, wherein the copolymer has a nitrogen content of 0.01 wt % or more and 5 wt % or less and the copolymer has an SP value of 8.0 to 12 $(\text{cal/cm}^3)^{1/2}$.

7 Claims, No Drawings

DISPERSANT FOR CARBON MATERIAL, DISPERSION CONTAINING DISPERSANT FOR CARBON MATERIAL, ELECTRODE SLURRY FOR ALL-SOLID LITHIUM-ION SECONDARY BATTERY, MANUFACTURING METHOD FOR ELECTRODE FOR ALL-SOLID LITHIUM-ION SECONDARY BATTERY, ELECTRODE FOR ALL-SOLID LITHIUM-ION SECONDARY BATTERY, AND ALL-SOLID LITHIUM-ION SECONDARY BATTERY

TECHNICAL FIELD

The present invention relates to a dispersant for carbon materials; a dispersion containing the dispersant for carbon materials; an electrode slurry for an all-solid lithium ion secondary battery, containing the dispersion; a method of producing an electrode for an all-solid lithium ion secondary battery, including preparing the electrode slurry for an all-solid lithium ion secondary battery; an electrode for an all-solid lithium ion battery; and an all-solid lithium ion secondary battery, including the electrode for an all-solid lithium ion battery.

BACKGROUND ART

Carbon materials, such as carbon black (CB), carbon nanotube (CNT), carbon nanofiber (CNF), carbon fiber (CF), acetylene black (AB), and fullerene, are used as colored pigments, light-shielding materials, or conductive materials in a wide range of fields including printing ink, inkjet ink, ink for writing instruments, painting materials, and plastic forming materials. Generally, it is important to uniformly disperse a carbon material in a solvent, a film, a coating film, a formed article, or the like in order to meet the quality required for these applications. These carbon materials have a low affinity for other molecules (such as solvents), and are not easily dispersed uniformly in an organic solvent or resin, so that a dispersant is usually used. A conventional dispersant such as polyvinylpyrrolidone (PVP) is known to dissolve in a high-polarity solvent such as N-methylpyrrolidone to exhibit dispersion properties. Yet, such a dispersant does not exhibit dispersion properties in a low-polarity solvent because it is insoluble in the low-polarity solvent, which limits dispersion media for carbon materials and use of materials in which a carbon material is dispersed.

For example, materials for conventional lithium ion secondary batteries include one in which a dispersant such as polyvinylpyrrolidone (PVP) or polyvinylidene fluoride (PVDF) is dissolved in a high-polarity solvent highly capable of dispersing a material such an active material or a conductive additive in the battery manufacturing process (for example, Patent Literature 1).

Conventional lithium ion secondary batteries use an electrolyte obtained by dissolving a lithium salt in an organic solvent, so that these batteries may ignite in the event of abnormality. Thus, all-solid lithium ion secondary batteries have been developed in recent years in which a solid electrolyte is used as an electrolyte not containing an organic solvent in order to reduce the risk of ignition. Yet, solid electrolytes for all-solid lithium ion secondary batteries are known to change their properties upon contact with a high-polarity solvent, resulting in a low ion conductivity (for example, Patent Literature 2). Thus, it is preferred to use a low-polar solvent in the production of all-solid lithium ion secondary batteries.

Yet, polyvinylpyrrolidone (PVP) and polyvinylidene fluoride (PVDF) which are commonly used as dispersants in the production of conventional lithium ion secondary batteries are insoluble in low-polar solvents, and are thus not usable as dispersants in the production of all-solid lithium ion secondary batteries. There is a demand to develop a dispersant that achieves solubility in a low-polar solvent and capability of dispersing a carbon material in a low-polar solvent in a balanced manner.

CITATION LIST

Patent Literature

Patent Literature 1: JP-A 2012-178327
Patent Literature 2: JP-A 2014-093263

SUMMARY OF INVENTION

Technical Problem

The present invention aims to provide a dispersant for carbon materials, the dispersant being capable of increasing affinity of a carbon material such as a conductive additive for low-polar solvents and low-polar media to reduce aggregation of the carbon material so as to improve the dispersion uniformity and dispersion stability of the carbon material in the low-polar solvents and low-polar media. The present invention aims to provide an all-solid lithium ion secondary battery including an electrode for an all-solid lithium ion secondary battery, the electrode being excellent in high-current charge/discharge characteristics, cycle characteristics, and electrode conductivity.

Solution to Problem

As a result of studies to solve the above problem, the present inventors completed the present invention.

Specifically, the present invention provides a dispersant for carbon materials, the dispersant containing a copolymer having a nitrogen-containing group, wherein the copolymer has a nitrogen content of 0.01 wt % or more and 5 wt % or less, and the copolymer has an SP value of 8.0 to 12 $(cal/cm^3)^{1/2}$; a dispersion containing the dispersant for carbon materials, a carbon material, and a low-polar solvent having a dielectric constant of 1.5 or more and 6.4 or less and/or a low-polar medium that is a hydrocarbon resin having a dielectric constant of 1.5 or more and 6.4 or less; an electrode slurry for an all-solid lithium ion secondary battery, the electrode slurry containing the dispersion, a solid electrolyte, and a positive electrode active material or a negative electrode active material; and a method of producing an electrode for an all-solid lithium ion secondary battery, the method including preparing the electrode slurry for an all-solid lithium ion secondary battery by mixing the dispersion, a conductive additive, a solid electrolyte, and a positive electrode active material or a negative electrode active material; an electrode for an all-solid lithium ion secondary battery, the electrode containing the dispersion, a solid electrolyte, and a positive electrode active material or a negative electrode active material; and an all-solid lithium ion secondary battery including the electrode for an all-solid lithium ion secondary battery.

Advantageous Effects of Invention

The present invention can provide a dispersant for carbon materials, the dispersant being capable of increasing affinity of a carbon material such as a conductive additive for low-polar solvents and low-polar media to reduce aggregation of the carbon material so as to improve the dispersion uniformity and dispersion stability of the carbon material in the low-polar solvents and low-polar media. An all-solid lithium ion secondary battery including the dispersant for carbon materials can exhibit better battery performance. The present invention can also provide an all-solid lithium ion secondary battery including an electrode for an all-solid lithium ion secondary battery, the electrode being excellent in high-current charge/discharge characteristics, cycle characteristics, and electrode conductivity.

DESCRIPTION OF EMBODIMENTS

Carbon Material Dispersant

The dispersant for carbon materials of the present invention is described.

The dispersant for carbon materials of the present invention contains a copolymer having a nitrogen-containing group. The copolymer has a nitrogen content of 0.01 wt % or more and 5 wt % or less, and the copolymer has an SP value of 8.0 to 12 $(cal/cm^3)^{1/2}$.

The copolymer having a nitrogen-containing group is preferably a composition containing at least one copolymerizable monomer (X) as a constituent monomer. The copolymerizable monomer (X) is a compound having a vinyl group (hereinafter referred to as a "vinyl compound"). The copolymerizable monomer can further contain a copolymerizable monomer having a polar functional group as a polymerization unit. The copolymerizable monomer having a polar functional group is copolymerized with the vinyl compound and contained in the polymer as a polymerization unit. The copolymerizable monomer is preferably a monomer that can introduce a polar functional group to a side chain or an end of the copolymer.

The vinyl compound is a compound having at least one vinyl group (excluding an acryloyl group and/or a methacryloyl group) in the molecule. Examples of such a vinyl compound include n-butyl vinyl ether, dodecyl vinyl ether, cyclohexyl vinyl ether, diethylene glycol divinyl ether, dimethoxymethylvinylsilane, dimethyldivinylsilane, 2-methyl-1,5-hexadiene, 3-methyl-1-pentene, styrene, 2-methylstyrene, 3-methylstyrene, 4-methylstyrene, triphenylvinylsilane, 9-vinylanthracene, 5-vinylbicyclo[2.2.1]hepta-2-ene, 4-vinylbiphenyl, 9-vinylcarbazole, vinylcyclohexane, vinylcyclopentane, 1-vinylnaphthalene, and 2-vinyloxytetrahydropyran.

Examples of the polar functional group include a vinyl compound containing at least one (meth)acrylic acid ester compound (a (meth)acryloyl group (which means an acryloyl group and/or a methacryloyl group). Examples of the linear (meth)acrylic acid ester compound include methyl (meth)acrylate, ethyl (meth)acrylate, n-propyl (meth)acrylate, n-butyl (meth)acrylate, n-pentyl (meth)acrylate, n-hexyl (meth)acrylate, n-heptyl (meth)acrylate, n-octyl (meth)acrylate, n-nonyl (meth)acrylate, n-decyl (meth)acrylate, n-dodecyl (meth)acrylate, n-tridecyl (meth)acrylate, n-tetradecyl (meth)acrylate, n-pentadecyl (meth)acrylate, n-hexadecyl (meth)acrylate, n-octadecyl (meth)acrylate, n-icosyl (meth)acrylate, n-tetracosyl (meth)acrylate, n-triacontyl (meth)acrylate, n-hexatriacontyl (meth)acrylate, and n-dotriacontyl (meth)acrylate. Examples of the branched (meth)acrylic acid ester compound include isopentyl (meth)acrylate, isohexyl (meth)acrylate, isoheptyl (meth)acrylate, isooctyl (meth)acrylate, 2-ethylhexyl (meth)acrylate, 3,5,5-trimethylhexyl (meth)acrylate, isodecyl (meth)acrylate, 2,4,6-trimethylheptyl (meth)acrylate, 2-ethyl-n-dodecyl (meth)acrylate, 2-methyl-n-tetradecyl (meth)acrylate, isohexadecyl (meth)acrylate, 2-n-octyl-n-nonyl (meth)acrylate, isooctadecyl (meth)acrylate, 1-n-hexyl-n-tridecyl, 2-ethyl-n-heptadecyl, isoicosyl (meth)acrylate, 1-n-octyl-n-pentadecyl (meth)acrylate, 2-n-decyl-n-tetradecyl (meth)acrylate, 2-n-dodecyl-n-pentadecyl (meth)acrylate, isotriacontyl (meth)acrylate, 2-n-tetradecyl-n-heptadecyl (meth)acrylate, 2-n-hexadecyl-n-heptadecyl (meth)acrylate, 2-n-heptadecyl-n-icosyl (meth)acrylate, 2-n-hexadecyl-n-docosyl(meth)acrylate, 2-octyl nonyl (meth)acrylate, isooctadecyl (meth)acrylate, 1-hexyl tridecyl (meth)acrylate, 2-ethyl-n-heptadecyl (meth)acrylate, isotricontyl (meth)acrylate, 2-n-tetradecyl-n-heptadecyl (meth)acrylate, 2-n-heptadecyl-n-icosyl (meth)acrylate, 2-n-hexadecyl-n-docosyl (meth)acrylate, 2-n-icosyl-n-docosyl (meth)acrylate, 2-n-tetracosyl-n-hexacosyl (meth)acrylate, 2-methyl-n-pentacontyl (meth)acrylate, 2-n-tetradecyl-n-tetracontyl (meth)acrylate, 2-n-dodecyl-n-hexatetracontyl (meth)acrylate, and 1-n-octacocyl-n-tricontyl (meth)acrylate. Examples also include 2 to 20 mol alkylene oxide (ethylene oxide, propylene oxide, or butylene oxide) adducts of these vinyl compounds.

Examples also include a vinyl compound having at least one hydroxyl group. Specific examples include 1-hydroxyethyl (meth)acrylate, 2-hydroxyethyl (meth)acrylate, 3-hydroxypropyl (meth)acrylate, 4-hydroxybutyl (meth)acrylate, 5-hydroxypentyl (meth)acrylate, and 6-hydroxyhexyl (meth)acrylate.

Examples also include a vinyl compound having at least one amide group. Specific examples include those in which two C1-C4 alkyl groups are bonded to a nitrogen atom (such as N,N-dimethyl (meth)acrylamide, N,N-diethyl (meth)acrylamide, N,N-diisopropyl (meth)acrylamide, and N,N-di-n-butyl (meth)acrylamide); those having an aminoalkyl group (C2-C6) in which two C1-C4 alkyl groups are bonded to a nitrogen atom of an aminoalkyl group (such as N—(N',N'-dimethylaminoethyl) (meth)acrylamide, N—(N',N'-diethylaminoethyl) (meth)acrylamide, N—(N',N'-dimethylaminopropyl) (meth)acrylamide, and N—(N',N'-di-n-butylaminobutyl) (meth)acrylamide); N-vinyl carboxylic acid amides (such as N-vinylformamide, N-vinylacetamide, N-vinyl-n- or isopropionic acid amide, and N-vinyl hydroxyacetamide), N-methyl (meth)acrylamide, N-ethyl (meth)acrylamide, N-propyl (meth)acrylamide, N-isopropyl (meth)acrylamide, N-butyl (meth)acrylamide, N-isobutyl (meth)acrylamide, N-t-butyl (meth)acrylamide, N,N-dimethylaminopropyl (meth)acrylamide, N,N-methylene-bis (meth)acrylamide, N-methylol (meth)acrylamide, and hydroxyethyl (meth)acrylamide.

Examples also include a vinyl compound having at least one amino group. Specific examples include dimethylaminoethyl (meth)acrylate, diethylaminoethyl (meth)acrylate, N,N-dimethylaminoethyl (meth)acrylate, and (meth)acryloylmorpholine.

Examples also include nitrogen-containing alicyclic (meth)acrylates (such as N-vinyl-morpholine, morpholinoethyl (meth)acrylate, 2,2,6,6-tetramethyl-4-piperidyl (meth)acrylate, and N-vinyl-2,2,6,6-tetramethylpiperidine, aromatic monomers (such as N—(N',N'-diphenylaminoethyl) (meth)acrylamide, N,N-dimethylaminostyrene, 4-vinylpyridine, 2-vinylpyridine, N-vinylpyrrole, N-vinylimidazole, N-vinylpyrrolidone, and N-vinylpyrrolidone), and hydrochlorides, sulfates, phosphates, and lower alkyl (C1-C8) monocarboxylates (such as acetic acid and propionic acid) of these monomers.

In view of the dispersibility of a carbon material, the vinyl compound as the copolymer having a nitrogen-containing group is preferably a compound containing a copolymer (A) (hereinafter also referred to as a "copolymer (A)") of a (meth)acrylic acid ester monomer (a) (hereinafter also referred to as a "monomer (a)") represented by the following formula (1) and a nitrogen-containing vinyl monomer (b) (hereinafter also referred to as a "monomer (b)"). More preferably, the nitrogen-containing vinyl monomer (b) is a monomer (b1) represented by the following formula (2).

[Chem. 1]

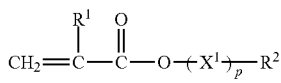

(1)

The formula (1) preferably satisfies the following requirements.

In the formula (1), $R^1$ is a hydrogen atom or a methyl group; $X^1$ is a C2-C4 oxyalkylene group; $R^2$ is a C8-C32 alkyl group when p=0, or a C1-C32 alkyl group when p=1 to 20; p is an integer of 0 to 20, each $X^1$ may be the same or different when p is 2 or greater, and $(X^1)_p$ moieties may be bonded randomly or in block.

$R^1$ in the formula (1) is a hydrogen atom or a methyl group. Of these, $R^1$ is preferably a methyl group in view of the solubility of the dispersant for carbon materials of the present invention in a low-polar solvent and a low-polar medium (described later) (hereinafter also simply referred to as "solubility of the dispersant for carbon materials of the present invention).

$X^1$ in the formula (1) is a C2-C4 oxyalkylene group. Examples of the C2-C4 oxyalkylene group include an oxyethylene group, an oxypropylene group, an oxybutylene group, and groups obtained by partial replacement of hydrogen atoms in these groups with halogen atoms or hydroxyl groups, for example.

The C2-C4 alkylene group to form the C2-C4 oxyalkylene group in $X^1$ in the formula (1) may be either linear or branched as long as it does not affect physical properties of the dispersant for carbon materials of the present invention. Yet, in view of the solubility of the dispersant for carbon materials of the present invention, the C2-C4 alkylene group is preferably linear.

When p is 2 or greater, each $X^1$ may be the same or a different C2-C4 oxyalkylene group.

p in the formula (1) is an integer of 0 to 20. In view of the solubility of the dispersant for carbon materials of the present invention, p is preferably an integer of 0 to 10, more preferably an integer of 0 to 5. When p is 2 or greater, $(X^1)p$ moieties may be bonded randomly or in block.

$R^2$ in the formula (1) is a C8-C32 alkyl group when p=0 or a C1-C32 alkyl group when p=1 to 20.

$R^2$ when p=0 is a C8-C32 alkyl group. Examples of the linear C8-C32 alkyl group include octyl, nonyl, decyl, undecyl, dodecyl, tridecyl, tetradecyl, pentadecyl, hexadecyl, heptadecyl, octadecyl, nonadecyl, icosyl, eicosyl, henicosyl, heneicosyl, docosyl, tricosyl, tetracosyl, pentacosyl, hexacosyl, heptacosyl, octacosyl, nonacosyl, triacontyl, hentriacontyl, and dotriacontyl. Examples of the branched C8-C32 alkyl group include isopentyl, isohexyl, isoheptyl, isooctyl, 2-ethylhexyl, 3,5,5-trimethylhexyl, isodecyl, 2,4,6-trimethylheptyl, 2-ethyl-n-dodecyl, 2-methyl-n-tetradecyl, isohexadecyl, 2-octylnonyl, 2-hexylundecyl, 2-ethylpentadecyl, 2-(3-methylhexyl)-7-methyl-nonyl, isooctadecyl, 1-hexyltridecyl, 2-ethylheptadecyl, 2-octylundecyl, isoicosyl, 1-undecyldodecyl, 1-octylpentadecyl, 2-decyltridecyl, 2-decyltetradecyl, 2-(1,4,4-trimethylbutyl)-5,7,7-trimethylheptyl, 2-dodecylpentadecyl, isotricontyl, 2-tetradecylheptadecyl, 2-hexadecylheptadecyl, 1-heptyltricontyl, 2-heptadecylicosyl, 1-octadecylicosyl, 2-hexadecyldocosyl, 2-(1,4,4-trimethylbutyl)-5,7,7-trimethyl-tricontyl, 2-icosyldocosyl, and 1-icosyltetracosyl. These alkyl groups of the monomers may be linear or branched alkyl groups. Of these, a C10-C24 alkyl group is preferred in view of the solubility of the dispersant for carbon materials of the present invention.

$R^2$ is a C1-C32 alkyl group when p=1 to 20. Examples of alkyl groups other than the C8-C32 alkyl group include methyl, ethyl, propyl, butyl, pentyl, hexyl, and nonyl.

In view of the dispersibility of the carbon material, the compound represented by the formula (1) is preferably n-octyl (meth)acrylate, n-nonyl (meth)acrylate, n-decyl (meth)acrylate, n-dodecyl (meth)acrylate, n-tridecyl (meth)acrylate, n-tetradecyl (meth)acrylate, n-pentadecyl (meth)acrylate, n-hexadecyl (meth)acrylate, n-octadecyl (meth)acrylate, n-icosyl (meth)acrylate, n-icosyl(meth)acrylate, n-tetracosyl (meth)acrylate, n-triacontyl (meth)acrylate, n-dotriacontyl (meth)acrylate, 2-methoxyethyl (meth)acrylate, or diethylene glycol monomethyl ether (meth)acrylate.

[Chem. 2]

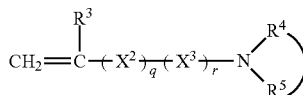

(2)

The formula (2) preferably satisfies the following requirements.

$R^3$ in the formula (2) is a hydrogen atom or a methyl group; $X^2$ is at least one group selected from the group consisting of an ester group, an amide group, a carbonyl group, and an aliphatic hydrocarbon group, and q is an integer of 0 or 1; $X^3$ is a C2-C4 alkylene group, and r is an integer of 0 or 1; $R^4$ and $R^5$ contained in an amino group in the formula (2) are C1-C4 hydrocarbon groups that may be the same or different from each other, and may be bonded together to form a ring; and when the amino group in the formula (2) is a cyclic amino group formed by bonding of $R^4$ and $R^5$, the cyclic amino group contains a C4-C5 hydrocarbon group and 0 to 2 carbonyl groups.

$R^3$ in the formula (2) is a hydrogen atom or a methyl group. Of these, $R^3$ is preferably a methyl group in view of the solubility of the dispersant for carbon materials of the present invention.

$X^2$ in the formula (2) is at least one group selected from the group consisting of an ester group, an amide group, a carbonyl group, and an aliphatic hydrocarbon group, and q is an integer of 0 or 1. $X^2$ is preferably an ester group, an amide group, or a carbonyl group in view of the electrochemical stability.

$X^3$ in the formula (2) is a C2-C4 alkylene group, and r is an integer of 0 or 1. Examples of the C2-C4 alkylene group include an ethylene group (dimethylene group), a trimethylene group, a tetramethylene group, and groups obtained by partial replacement of hydrogen atoms in these groups with halogen atoms or hydroxyl groups, for example. Of these, the C2-C4 alkylene group is preferably an ethylene group in view of the dispersibility of the carbon material. The C2-C4 alkylene group may be either linear or branched as long as it does not affect physical properties of the dispersant for carbon materials of the present invention.

$R^4$ and $R^5$ contained in the amino group in the formula (2) are C1-C4 hydrocarbon groups that may be the same or different from each other, and may be bonded together to form a ring. When the amino group in the formula (2) is a cyclic amino group formed by bonding of $R^4$ and $R^5$, the cyclic amino group contains a C4-C5 hydrocarbon group and 0 to 2 carbonyl groups.

In view of electrochemical stability and dispersibility of the carbon material, preferred examples of compounds represented by the formula (2) include N—(N',N'-diphenylaminoethyl) (meth)acrylamide, N—(N',N'-dimethylaminoethyl) (meth)acrylamide, N—(N',N'-diethylaminoethyl) (meth)acrylamide, N—(N',N'-dimethylaminopropyl) (meth)acrylamide, morpholinoethyl (meth)acrylate, N,N-dimethylaminoethyl (meth)acrylate, N,N-diethylaminoethyl (meth)acrylate, and N-vinylpyrrolidone. In view of the dispersibility of the carbon material, N,N-dimethylaminoethyl (meth)acrylate, N,N-diethylaminoethyl (meth)acrylate, N-vinylpyrrolidone, 2,2,6,6-tetramethylpiperidylethyl (meth)acrylate, and N-vinyl 2,2,6,6-tetramethylpiperidyl are more preferred, and N-vinylpyrrolidone is still more preferred.

In the copolymer (A), the nitrogen-containing vinyl monomer (b) preferably contains at least two monomers (b1) in view of the solubility of the dispersant for carbon materials of the present invention and dispersibility of the carbon material.

The copolymer (A) may be a random copolymer or a block copolymer, but it is preferably a random copolymer in view of the balance between solubility of the dispersant for carbon materials of the present invention and dispersibility of the carbon material. The copolymer (A) may be linear or branched.

In view of the balance between solubility of the dispersant for carbon materials of the present invention and dispersibility of the carbon material, the copolymer (A) preferably contains, in addition to the monomer (a) and the monomer (b), a (meth)acrylic acid alkyl ester (c) having a C1-C4 alkyl group (hereinafter also referred to as a "monomer (c)") as a structural unit.

Examples of the monomer (c) include methyl (meth)acrylate, ethyl (meth)acrylate, propyl (meth)acrylate, and butyl (meth)acrylate. The monomer (c) is preferably methyl methacrylate in view of the solubility of the dispersant for carbon materials of the present invention.

The percentage of the monomer (a) constituting the copolymer (A) is preferably 70 to 90 wt %, more preferably 80 to 90 wt %, based on the weight of the copolymer (A), in view of the solubility of the dispersant for carbon materials of the present invention. These ranges result in improved solubility of the dispersant for carbon materials of the present invention or improved dispersibility of the carbon material, making it possible to improve the battery performance of a battery including a dispersion of the carbon material.

The percentage of the monomer (b) constituting the copolymer (A) is preferably 1 to 30 wt %, more preferably 1 to 20 wt %, still more preferably, 1 to 15 wt %, based on the weight of the copolymer (A), in view of the dispersibility of the carbon material.

The percentage of the monomer (c) constituting the copolymer (A) is preferably 5 to 20 wt %, more preferably 5 to 15 wt %, based on the weight of the copolymer (A), in view of the solubility of the dispersant for carbon materials of the present invention.

The copolymer having a nitrogen-containing group can be obtained by a known production method. In one specific exemplary method, the copolymer (A) can be obtained by solution-polymerizing the monomers (a) to (c) in a solvent in the presence of a polymerization catalyst. Examples of the solvent include toluene, xylene, C9-C10 alkylbenzene, methyl ethyl ketone, and mineral oil.

Examples of the polymerization catalyst include azo catalysts (such as 2,2'-azobis(2-methylbutyronitrile) and 2,2'-azobis(2,4-dimethylvaleronitrile)), peroxide catalysts (such as benzoyl peroxide, cumyl peroxide, and lauryl peroxide), and redox catalysts (such as a mixture of benzoyl peroxide and tertiary amine). Further, a known chain transfer agent (such as C2-C20 alkyl mercaptan) can be used, if necessary.

The polymerization temperature is 25° C. to 140° C., more preferably 50° C. to 120° C. in view of the industrialization. In addition to the solution polymerization, bulk polymerization, emulsion polymerization, or suspension polymerization can be used to produce a copolymer having a nitrogen-containing group.

The weight average molecular weight (hereinafter sometime abbreviated to "Mw") of the copolymer having a nitrogen-containing group is preferably 10000 to 300000, more preferably 25000 to 250000. In view of the dispersion stability, the Mw is still more preferably 50000 to 200000. In a molecular weight distribution curve of the copolymer, the peak area in a region corresponding to ¼ or less of the peak top molecular weight (hereinafter sometimes abbreviated to as "Mp") is preferably 11.0% or less, more preferably 10.0% or less, of the total peak area, and the peak area is still more preferably 9.0% or less in view of the dispersion stability. The peak area in the molecular weight distribution curve can be calculated from the integral of the molecular weight distribution curve.

Mw and Mp of the copolymer having a nitrogen-containing group can be measured by gel permeation chromatography under the following conditions.

Mw and Mp Measurement Conditions

Device: "HLC-802A" (Tosoh Corporation)
Column: "TSKgel GMH6" (Tosoh Corporation), two columns
Measurement temperature: 40° C.
Sample solution: 0.5 wt % solution in tetrahydrofuran
Amount of solution to be injected: 200 µl
Detector: refractive index detector
Standard substance: standard polystyrene (TSK standard POLYSTYRENE) 12 samples (molecular weight: 500, 1,050, 2,800, 5,970, 9,100, 18,100, 37,900, 96,400, 190,000, 355,000, 1,090,000, and 2,890,000) (Tosoh Corporation)

In view of the solubility, the SP value of the copolymer having a nitrogen-containing group is 8.0 to 12 $(cal/cm^3)^{1/2}$, preferably 8.5 to 11 $(cal/cm^3)^{1/2}$, more preferably 8.5 to 10.5 $(cal/cm^3)^{1/2}$, particularly preferably 9.0 to 10.0 $(cal/cm^3)^{1/2}$.

Here, the SP value in the present invention is the value of the solubility parameter at 25° C. which is peculiar to each material. The SP value is one of indexes for predicting the solubility of the material. A higher SP value indicates a higher polarity, and a lower SP value indicates a lower polarity. When mixing two materials, a smaller difference in the SP value between the two materials results in a higher solubility.

The SP value (solubility parameter) of the copolymer having a nitrogen-containing group is calculated as the product of the SP value and the mole ratio of each monomer constituting the copolymer having a nitrogen-containing group. For example, when a copolymer is formed from two monomers (X and Y), the SP value of the copolymer can be represented by the following relational expression (1), where x and y are mole ratios (mol %) of these monomers and SPx and SPy are SP values of these monomers.

$$SP=[(x \times SPx)+(y \times SPy)] \quad \text{Relational expression (1):}$$

The SP value of each monomer is calculated by determining the evaporation energy ($\Delta ei$) and the molar volume ($\Delta vi$) of atoms or atomic groups in the molecular structure of the monomer according to the method proposed by Fedors (Polym. Eng. Sci. Vol. 114. p. 114 (1974)) and substituting the values into the following relational expression (2). It should be noted that the molecular structure of the monomer is one in which a double bond of the monomer is cleaved.

$$\sigma=(\Sigma \Delta ei / \Sigma \Delta vi)^{1/2} \quad \text{Relational expression (2):}$$

The nitrogen content of the copolymer having a nitrogen-containing group can be measured by a method that uses a total nitrogen analyzer "Antek 7000" available from Antek Instruments, Inc.

A sample is accurately weighed to the digit of 1 mg in a 100-mL volumetric flask such that the nitrogen concentration in the sample solution is about 100 ppm, and the sample solution is diluted to 100 mL with a nitrogen-free diluent such as xylene. The volumetric flask is vigorously shaken to completely dissolve the sample.

Quinoline as a standard reagent for calibration curve is diluted with xylene such that the nitrogen concentration is about 50 ppm, about 100 ppm, or about 150 ppm to prepare standard solutions for calibration curve.

These three standard solutions for calibration curve having different nitrogen concentrations are measured using a total nitrogen analyzer to create a calibration curve. Subsequently, the prepared sample solution is measured using a total nitrogen analyzer.

The nitrogen content of the sample is measured from the measurement result using the following formula. (A is the nitrogen concentration (ppm) in the sample solution determined by the calibration curve, and S is the collected amount (g) of the sample.)

Nitrogen content(wt %)=$A/S \times 1/100$

The nitrogen content in the copolymer having a nitrogen-containing group is 0.01 to 5 wt %, preferably 0.05 to 3 wt %, more preferably 0.05 to 2 wt %, still more preferably 0.05 to 0.7 wt %, based on the weight of the copolymer, in view of the dispersibility of the carbon material.

When the nitrogen content is less than 0.01 wt %, disadvantageously, the dispersibility of the carbon material tends to be insufficient. When the nitrogen content is more than 5 wt %, disadvantageously, the dispersibility of the carbon material tends to be insufficient.

Dispersion

The present invention also provides a dispersion containing the dispersant for carbon materials of the present invention, a carbon material, and a low-polar solvent having a dielectric constant of 1.5 or more and 6.4 or less and/or a low-polar medium that is a hydrocarbon resin having a dielectric constant of 1.5 or more and 6.4 or less.

Since the dispersion of the present invention contains the dispersant for carbon materials of the present invention, the dispersion makes a carbon material highly dispersible in a low-polar solvent and a low-polar medium, and the carbon material in the low-polar solvent and the low-polar medium has excellent dispersion stability.

In view of improving the handleability, the dispersion of the present invention may optionally contain a low-polar solvent or a low-polar medium described below.

The low-polar solvent that can be used in the present invention is, for example, a solvent having a solubility of less than 1 g in 100 g of water at 20° C. The term "low-polar solvent" as used herein means a solvent that is usually non-polar or that has a dielectric constant of less than 10. The low-polar solvent may be an alkane-based solvent (e.g., heptane), or may be a solvent such as butyl butyrate or butyl ether, which is an ester or an ether having four or more carbon atoms at both ends.

Of these, the low-polar solvent for use in the present invention is preferably a solvent having a dielectric constant of 1.5 or more and 6.4 or less in order to inhibit reaction with a solid electrolyte. The dielectric constant is one of indexes for indicating the polar strength of an organic solvent. In measurement of the dielectric constant, 50 mL of an organic solvent having a water content of 5 ppm or less is used as a measurement sample. An AC voltage having a frequency of 1 MHz is applied using E4980A Precision LCR Meter available from KEYCOM Corporation and DPT-013-050 as an electrode available from KEYCOM Corporation, and the dielectric constant at 25° C. is measured.

Any organic solvent can be used in the present invention as long as it is a medium that can be removed by drying. Preferred examples include organic solvents having a dielectric constant of 1.5 or more and 6.4 or less, such as dibutyl ether, ester-based solvents (e.g., ethyl acetate, ethyl propionate, propyl propionate, butyl propionate, amyl propionate, hexyl propionate, heptyl propionate, octyl propionate, ethyl butyrate, propyl butyrate, butyl butyrate, amyl butyrate, hexyl butyrate, heptyl butyrate, octyl butyrate, ethyl valerate, propyl valerate, butyl valerate, amyl valerate, hexyl valerate, heptyl valerate, octyl valerate, ethyl caproate, propyl caproate, butyl caproate, amyl caproate, hexyl caproate, heptyl caproate, octyl caproate, ethyl enanthate, propyl enanthate, butyl enanthate, amyl enanthate, hexyl enanthate, heptyl enanthate, and octyl enanthate), alkane-based solvents (e.g., pentane, cyclopentane, hexane, cyclohexane, heptane, cycloheptane, octane, cyclooctane, nonane, and decan), toluene, xylene, benzene, paraffin, and carbon tetrachloride. More preferred examples include butyl esters (butyl butyrate, butyl propionate, and butyl valerate) and alkane-based solvents (hexane, cyclohexane, heptane, cycloheptane, octane, and cyclooctane) in order to inhibit reaction of the organic solvent with a solid electrolyte and in view of the melting point and the boiling point.

The low-polar medium for use in the present invention is preferably a low-polar medium that is a hydrocarbon resin having a dielectric constant of 1.5 or more and 6.4 or less, in order to inhibit reaction with a solid electrolyte.

Examples of such a low-polar medium include polyolefins such as polyethylene, polyisobutylene, polypropylene, and polybutylene; polydiene such as polybutadiene and natural rubber; vinyl polymers such as polyisoprene, polystyrene and polytetrafluoroethylene; and elastomers such as styrene butadiene rubber, styrene ethylene butylene rubber, styrene ethylene propylene rubber, styrene ethylene butylene rubber, and styrene ethylene propylene rubber.

The dispersion of the present invention contains a carbon material as a conductive additive.

Any carbon material may be used as long as it is a conductive carbon material. Examples include graphite, carbon black (CB), carbon nanotube (CNT), carbon nanofiber (CNF), carbon fiber (CF), acetylene black (AB), fullerene, and natural graphite. These can be used alone or in combination of two or more thereof. Use of carbon nanotube (CNT) is preferred in order to reduce the internal resistance of the electrodes.

Electrode Slurry for All-Solid Lithium Ion Secondary Battery

The present invention also provides an electrode slurry for an all-solid lithium ion secondary battery, the electrode slurry containing the dispersion of the present invention, a solid electrolyte, and a positive electrode active material or a negative electrode active material.

In order to produce electrodes for an all-solid lithium ion secondary battery (a positive electrode and a negative electrode), first, an electrode slurry for an all-solid lithium ion secondary battery is prepared.

The electrode slurry for an all-solid lithium ion secondary battery is preferably obtained by adding the dispersion of the present invention, a solid electrolyte, a positive electrode active material or a negative electrode active material, and a binder, and mixing these components for 30 seconds using an ultrasonic disperser ("UH-50" available from SMT Co., Ltd.).

The amount of the dispersant for carbon materials of the present invention relative to 100 parts by mass of the electrode slurry for an all-solid lithium ion secondary battery is preferably 0.1 to 10 parts by mass. The amount is more preferably 0.1 to 5 parts by mass, in view of the balance between dispersibility of the carbon material and charge/discharge characteristics.

The amount of the carbon material as a conductive additive relative to 100 parts by mass of the electrode slurry for an all-solid lithium ion secondary battery is preferably 0.1 to 10 parts by mass. The amount is more preferably 0.1 to 5 parts by mass in view of the balance between input/output characteristics and charge/discharge capacity during charging and discharging. A low concentration of the carbon material may increase the internal resistance of the electrodes, possibly degrading input/output performance during charging and discharging. Too high a concentration may reduce the amount of active materials per electrode unit area, possibly reducing the charge/discharge capacity.

The electrode slurry for an all-solid lithium ion secondary battery contains a solid electrolyte.

Examples of the solid electrolyte include sulfide solid electrolytes, lithium lanthanum titanate, LISICON, thio-LISICON, lithium lanthanum barium tantalate, lithium iodide-aluminum oxide composites, and lithium phosphate oxynitride glass.

The solid electrolyte is preferably a sulfide solid electrolyte, more preferably a lithium ion conductive inorganic solid electrolyte containing Li, P, and S (sulfide solid electrolyte), still more preferably a lithium ion conductive inorganic solid electrolyte containing Li, P, S (sulfide solid electrolyte), and a halogen element.

The electrode slurry for an all-solid lithium ion secondary battery contains a positive electrode active material or a negative electrode active material.

The positive electrode active material is not limited. The positive electrode active material for an all-solid lithium ion secondary battery may be a metal compound such as a metal oxide or a metal sulfide capable of being doped or intercalated with lithium ions, or a conductive polymer, for example. Examples include oxides of transition metals such as iron, cobalt, nickel, vanadium, and manganese, complex oxides with lithium, and inorganic compounds such as transition metal sulfides. Specific examples include transition metal oxide powder such as MnO, $V_2O_5$, $V_6O_{13}$, and $TiO_2$; powder of a composite oxide of lithium and a transition metal, such as lithium nickelate, lithium cobaltate, and lithium manganate each having a layered structure; powder of a composite oxide of lithium and a transition metal such as lithium manganate having a spinel structure; and lithium iron phosphate materials which are phosphoric acid compounds having an olivine structure. A positive electrode active material having a surface coated with $LiNbO_3$ by a coater can also be used.

The amount of the positive electrode active material relative to 100 parts by mass of the electrode slurry for an all-solid lithium ion secondary battery is preferably 30 to 60 parts by mass. The amount is more preferably 30 to 50 parts by mass in view of coating suitability.

The negative electrode active material is not limited. The negative electrode active material for an all-solid lithium ion secondary battery may be metallic lithium capable of being doped or intercalated with lithium ions or its alloy, a tin alloy, a silicon alloy, a metal oxide such as $LiXFe_2O_3$, $LiXFe_3O_4$, or $LiXWO_2$ (X is any positive number), a conductive polymer such as polyacetylene or poly-p-phenylene, an amorphous carbonaceous material such as soft carbon or hard carbon, carbonaceous powder of a carbon material such as synthetic graphite (e.g., graphitized carbon material) or natural graphite carbon; or a carbon material such as carbon black, mesophase carbon black, a resin-fired carbon material, vapor-grown carbon fiber, or carbon fiber.

The amount of the negative electrode active material relative to 100 parts by mass of the electrode slurry for an all-solid lithium ion secondary battery is preferably 20 to 50 parts by mass. The amount is more preferably 20 to 40 parts by mass in view of coating suitability.

A solvent to prepare the electrode slurry for an all-solid lithium ion secondary battery of the present invention may be a low-polar solvent that can be optionally added to the dispersant for carbon materials of the present invention.

The dielectric constant of such a low-polar solvent is preferably 6.0 or less, more preferably 5.5 or less. The dielectric constant is more preferably 5.1 or less in order to maintain charge/discharge characteristics.

A solvent having a dielectric constant of more than 6.4 causes a decomposition reaction of components of the solid electrolyte, which may result in poor battery performance.

The electrode slurry for an all-solid lithium ion secondary battery preferably contains a binder.

The binder is not limited. For example, the binder can be a binder resin such as polyvinylidene fluoride (PVDF), butadiene rubber (BR), carboxymethyl cellulose (CMC), or styrene butadiene rubber (SBR). In view of high-temperature durability, the binder is preferably, for example, polyimide, polyamide, polyamideimide, polyacryl, carboxymethyl cellulose, or a combination thereof.

The amount of the binder relative to 100 parts by mass of the electrode slurry for an all-solid lithium ion secondary battery is preferably 0.5 to 20 parts by mass. The amount is more preferably 1 to 10 parts by mass in view of coating suitability.

Electrode for All-Solid Lithium Ion Secondary Battery

The present invention also provide an electrode for an all-solid lithium ion secondary battery, the electrode containing the dispersion of the present invention, a solid electrolyte, and a positive electrode active material or a negative electrode active material.

The electrode for an all-solid lithium ion secondary battery of the present invention has excellent electrochemical stability because the dispersion stability of the carbon material can be enhanced without inhibiting the ion conductivity of the solid electrolyte.

The electrode for an all-solid lithium ion secondary battery of the present invention can be obtained by a method including preparing the electrode slurry for an all-solid lithium ion secondary battery of the present invention by mixing the dispersion of the present invention, a solid electrolyte, and a positive electrode active material or a negative electrode active material. Such a method of producing the electrode for an all-solid lithium ion secondary battery of the present invention is one embodiment of the present invention.

The positive electrode can be obtained by, for example, applying a positive electrode slurry containing the dispersion of the present invention, a solid electrolyte, and a positive electrode active material, and also containing, if necessary, a binder and a low-polar solvent, to a current collector and drying the positive electrode slurry. Specifically, the positive electrode slurry is applied to a current collector by a blade method, dried naturally, and dried on a 100° C. hot plate for 30 minutes to remove the solvent, whereby a positive electrode can be produced.

The amount of the positive electrode active material in the positive electrode is preferably 50 mass % to 90 mass %, more preferably 60 mass % to 80 mass %.

The negative electrode can be obtained by, for example, applying a negative electrode slurry containing the dispersion of the present invention, a solid electrolyte, and a negative electrode active material, and also containing, if necessary, a binder and a low-polar solvent, to a current collector and drying the positive electrode slurry. Specifically, the negative electrode slurry is applied to a current collector by a blade method, dried naturally, and dried on a 100° C. hot plate for 30 minutes to remove the solvent, whereby a negative electrode can be produced.

The amount of the negative electrode active material in the negative electrode is preferably 40 mass % to 80 mass %, more preferably 50 mass % to 70 mass %.

The current collector is not limited, and any known current collector can be used. Examples include aluminum, copper, titanium, nickel, stainless steel (SUS), and alloys thereof. Aluminum and copper are preferred in view of weight reduction, corrosion resistance, and high conductivity. The current collector for the positive electrode and the current collector for the negative electrode may be formed of the same material or different materials.

The dispersant for carbon materials of the present invention can be used to produce an electrode slurry for not only an all-solid lithium ion secondary battery but also for a non-aqueous lithium ion secondary battery, and a non-aqueous lithium ion secondary battery containing the dispersant for carbon materials of the present invention can exhibit performance comparable to that of a non-aqueous lithium ion secondary battery containing a polar solvent as a non-aqueous electrolyte.

All-Solid Lithium Ion Secondary Battery

The present invention also provides an all-solid lithium ion secondary battery including the electrode for an all-solid lithium ion secondary battery.

Owing to such a configuration, the all-solid lithium ion secondary battery of the present invention has excellent battery performance.

The all-solid lithium ion secondary battery of the present invention can be produced by a method that includes, for example, applying a slurry for a solid electrolyte by the blade method using an applicator to a surface coated with the negative electrode slurry of the negative electrode obtained by the above method. The method subsequently includes drying the solid electrolyte to obtain a solid electrolyte layer.

The thus-obtained negative electrode including a solid electrolyte layer is introduced into a mold and pressed to produce a separate layer formed of the solid electrolyte layer on the negative electrode.

The positive electrode obtained by the above method is overlaid on one side of the separate layer, and pressed, whereby an all-solid lithium ion secondary battery can be obtained.

EXAMPLES

Production of Dispersant for Carbon Materials

Production Example 1

Butyl butyrate as a reaction solvent was added to a reaction vessel equipped with a temperature controller, a stirrer blade equipped with bearing that can work at vacuum pressure, a nitrogen inlet, a nitrogen outlet, a stirrer, a heating and cooling device, a thermometer, and a nitrogen introduction tube. Then, the reaction vessel was charged with various monomers (a), monomers (b), and a monomer (c) listed for Production Example 1 in Table 1. The monomers (a) include decyl methacrylate (10 parts by mass), dodecyl methacrylate (40 parts by mass), tetradecyl methacrylate (20 parts by mass), and octadecyl methacrylate (20 parts by mass); the monomers (b) include N,N-dimethylaminoethyl methacrylate (2 parts by weight) and N-vinylpyrrolidone (3 parts by weight); and the monomer (c) includes methyl methacrylate (5 parts by weight). Subsequently, 2,2'-azobis(2-methylbutyronitrile) (0.18 parts by weight) was added, followed by replacement with nitrogen (gas-phase oxygen concentration: 100 ppm or less). Then, the temperature was raised to 76° C. while stirring in a sealed state to effect a polymerization reaction at the same temperature for 4 hours. After the temperature was raised to 120° C. to 130° C., the mixture was stirred for 30 minutes, whereby a copolymer (A-1) having a solids concentration of 50 wt % was obtained.

Copolymers (A-2) to (A-20) of Production Examples 2 to 20 each having a solids concentration of 50 wt % were obtained by adding the raw materials shown in Table 1 as in Production Example 1. Hereinafter, the parts by weight of the copolymers (A-1) to (A-20) specified without mentioning the solids concentration are the same as the parts by weight of the copolymers (A-1) to (A-20) each having a solids concentration of 100%.

Comparative Production Examples 1 to 3

Comparative copolymers (A'-1) to (A'-3) each having a solids concentration of 50 wt % were obtained by adding the raw materials shown in Table 1 as in Production Example 1. Hereinafter, the parts by weight of the comparative copolymers (A'-1) to (A'-3) specified without mentioning the solids concentration are the same as the parts by weight of the comparative copolymers (A'-1) to (A'-3) each having a solids concentration of 100%.

The weight average molecular weight of each of the copolymers (A-1) to (A-20) and the comparative copolymers (A'-1) to (A'-3) obtained as described above was measured by gel permeation chromatography under the following conditions.

Mw Measurement Conditions

Device: "HLC-802A" (Tosoh Corporation)
Column: "TSKgel GMH6" (Tosoh Corporation), two columns Measurement temperature: 40° C.
Sample solution: 0.5 wt % solution in tetrahydrofuran
Amount of solution to be injected: 200 µl
Detector: refractive index detector
Standard substance: standard polystyrene (TSK standard POLYSTYRENE) 12 samples (molecular weight: 500, 1,050, 2,800, 5,970, 9,100, 18,100, 37,900, 96,400, 190,000, 355,000, 1,090,000, and 2,890,000) (Tosoh Corporation)

When the copolymer (A) is soluble in a low-polar medium, it means that the turbidity of a 5 wt % solution of the copolymer (A) in butyl butyrate is 300 FTU or less (formazine).

The turbidity can be measured by the following method. The turbidity is measured using a digital turbidimeter 500G available from Kyoritsu Chemical-Check Lab., Corp. at a measurement wavelength of 660 nm and a liquid temperature of 25° C. under atmospheric pressure. As a control solution, a low-polar solvent (10 mL) is injected into a glass cell for measurement, and the turbidity is measured. The measured turbidity is taken as 0 FTU. The copolymer (A) and the comparative copolymer (A') are diluted with butyl butyrate such that the solids concentration is 5 wt %, whereby measurement samples are prepared. The measurement samples are measured within 5 minutes after preparation.

The turbidity was measured for the copolymers (A-1) to (A-20) each having a solids concentration of 50 wt % and the comparative copolymers (A'-1) to (A'-3) each having a solids concentration of 50 wt %. In the present application, 1.0 part of each of the copolymers (A-1) to (A-20) and the comparative copolymers (A'-1) to (A'-3) each having a solids concentration of 50 wt % was diluted with butyl butyrate as a low-polar solvent (9.0 parts), and the turbidity (formazine) was measured using a digital turbidimeter 500G (TB-500G) available from Kyoritsu Chemical-Check Lab., Corp. at 25° C. under atmospheric pressure. Table 1 shows the measurement results.

TABLE 1

| Production example | Copolymer (A) | Monomer (a) (parts by weight) | | | | | | | Monomer (b) (parts by weight) |
|---|---|---|---|---|---|---|---|---|---|
| | | Decyl methacrylate | Dodecyl methacrylate | Tetradecyl methacrylate | Octadecyl methacrylate | Dotriacontyl methacrylate | 2-Methoxyethyl methacrylate | Diethylene glycol monomethyl ether methacrylate | N,N-dimethylaminoethyl methacrylate |
| 1 | (A-1) | 10 | 40 | 20 | 20 | — | — | — | 2 |
| 2 | (A-2) | 10 | 40 | 20 | 15 | — | — | — | 2 |
| 3 | (A-3) | 5 | 45 | 20 | 15 | — | — | — | 2 |
| 4 | (A-4) | 2 | 50 | 20 | 13 | — | — | — | 2 |
| 5 | (A-5) | 1 | 50 | 20 | 13 | — | — | — | 0.5 |
| 6 | (A-6) | 1 | 50 | 20 | 13 | — | — | — | 0.5 |
| 7 | (A-7) | 1 | 50 | 20 | 13 | — | — | — | 0.5 |
| 8 | (A-8) | 1 | 50 | 20 | 13 | — | — | — | 0.5 |
| 9 | (A-9) | 1 | 50 | 20 | 13 | — | — | — | 0.5 |
| 10 | (A-10) | 1 | 50 | 20 | 13 | — | — | — | 0.5 |
| 11 | (A-11) | 1 | 50 | 20 | 13 | — | — | — | 0.5 |
| 12 | (A-12) | 1 | 50 | 20 | 13 | — | — | — | 0.5 |
| 13 | (A-13) | 1 | 50 | 20 | 13 | — | — | — | 2.7 |
| 14 | (A-14) | 1 | 50 | 20 | 13 | — | — | — | — |
| 15 | (A-15) | 1 | 50 | 20 | 13 | — | — | — | — |
| 16 | (A-16) | 1 | 50 | 20 | — | 13 | — | — | 0.5 |
| 17 | (A-17) | 1 | 38 | 14 | 9 | — | — | — | 20 |
| 18 | (A-18) | 1 | 35 | — | 63.5 | — | — | — | 0.5 |
| 19 | (A-19) | 10 | 40 | 20 | 20 | — | 5 | — | 2 |
| 20 | (A-20) | 10 | 40 | 20 | 20 | — | — | 5 | 2 |

| Production example | Monomer (b) (parts by weight) N,N-diethylaminoethyl methacrylate | N-vinyl-pyrrolidone | Monomer (c) (parts by weight) Methyl methacrylate | Total (parts by weight) | Amount of polymerization catalyst (parts by weight) | Mw of (A) (×10⁴) | Turbidity (FTU (formazine)) |
|---|---|---|---|---|---|---|---|
| 1 | — | 3 | 5 | 100 | 0.18 | 20 | 50 |
| 2 | — | 3 | 10 | 100 | 0.18 | 20 | 55 |
| 3 | — | 3 | 10 | 100 | 0.18 | 20 | 55 |
| 4 | — | 3 | 10 | 100 | 0.18 | 20 | 55 |
| 5 | — | 2.2 | 13.3 | 100 | 0.13 | 29 | 55 |
| 6 | — | 2.2 | 13.3 | 100 | 1.8 | 2 | 40 |

TABLE 1-continued

| | | | | | | | |
|---|---|---|---|---|---|---|---|
| 7 | — | 2.2 | 13.3 | 100 | 0.18 | 20 | 50 |
| 8 | — | 2.2 | 13.3 | 100 | 0.09 | 40 | 60 |
| 9 | — | 2.2 | 13.3 | 100 | 0.06 | 60 | 70 |
| 10 | — | 2.2 | 13.3 | 100 | 0.036 | 100 | 80 |
| 11 | — | 5 | 10.5 | 100 | 0.13 | 29 | 85 |
| 12 | — | 10 | 5.5 | 100 | 0.13 | 29 | 120 |
| 13 | — | — | 13.3 | 100 | 0.13 | 29 | 45 |
| 14 | 2.7 | — | 13.3 | 100 | 0.13 | 29 | 45 |
| 15 | — | 2.7 | 13.3 | 100 | 0.13 | 29 | 50 |
| 16 | — | 2.2 | 13.3 | 100 | 0.13 | 29 | 55 |
| 17 | — | 5 | 13 | 100 | 0.13 | 29 | 70 |
| 18 | — | — | — | 100 | 0.13 | 29 | 40 |
| 19 | — | 3 | — | 100 | 0.18 | 20 | 60 |
| 20 | — | 3 | — | 100 | 0.18 | 20 | 60 |

| Comparative production example | Comparative copolymer (A') | Monomer (a) (parts by weight) | | | | | | | Monomer (b) (parts by weight) N,N-dimethylaminoethyl methacrylate |
|---|---|---|---|---|---|---|---|---|---|
| | | Decyl methacrylate | Dodecyl methacrylate | Tetradecyl methacrylate | Octadecyl methacrylate | Dotriacontyl methacrylate | 2-Methoxyethyl methacrylate | Diethylene glycol monomethyl ether methacrylate | |
| 1 | (A'-1) | 10 | 40 | 20 | 20 | — | — | — | — |
| 2 | (A'-2) | 7 | 28 | 14 | 14 | — | — | — | 10 |
| 3 | (A'-3) | 3 | 15 | 6 | 6 | — | — | — | — |

| Comparative production example | Monomer (b) (parts by weight) | | Monomer (c) (parts by weight) | Total (parts by weight) | Amount of polymerization catalyst (parts by weight) | Mw of (A) (×10⁴) | Turbidity (FTU (formazine)) |
|---|---|---|---|---|---|---|---|
| | N,N-diethylaminoethyl methacrylate | N-vinyl-pyrrolidone | Methyl methacrylate | | | | |
| 1 | — | — | 10 | 100 | 0.18 | 20 | 20 |
| 2 | — | 20 | 7 | 100 | 0.18 | 20 | >500 |
| 3 | — | — | 70 | 100 | 0.18 | 20 | 100 |

Table 2 shows the nitrogen content (wt %) and SP value $(cal/cm^3)^{1/2}$ of each of the copolymers (A-1) to (A-20) and the comparative copolymers (A'-1) to (A'-3).

TABLE 2

| Production example | Copolymer (A) | Nitrogen content (wt %) | SP value $(cal/cm^3)^{1/2}$ |
|---|---|---|---|
| 1 | (A-1) | 0.56 | 9.43 |
| 2 | (A-2) | 0.56 | 9.50 |
| 3 | (A-3) | 0.56 | 9.50 |
| 4 | (A-4) | 0.56 | 9.49 |
| 5 | (A-5) | 0.32 | 9.44 |
| 6 | (A-6) | 0.32 | 9.44 |
| 7 | (A-7) | 0.32 | 9.44 |
| 8 | (A-8) | 0.32 | 9.44 |
| 9 | (A-9) | 0.32 | 9.44 |
| 10 | (A-10) | 0.32 | 9.44 |
| 11 | (A-11) | 0.67 | 9.63 |
| 12 | (A-12) | 1.30 | 9.97 |
| 13 | (A-13) | 0.24 | 9.31 |
| 14 | (A-14) | 0.20 | 9.30 |
| 15 | (A-15) | 0.34 | 9.47 |
| 16 | (A-16) | 0.32 | 9.45 |
| 17 | (A-17) | 2.41 | 10.02 |
| 18 | (A-18) | 0.04 | 8.96 |
| 19 | (A-19) | 0.56 | 9.31 |
| 20 | (A-20) | 0.56 | 9.33 |

TABLE 2-continued

| Comparative production example | Comparative copolymer (A') | Nitrogen content (wt %) | SP value $(cal/cm^3)^{1/2}$ |
|---|---|---|---|
| 1 | (A'-1) | 0 | 9.19 |
| 2 | (A'-2) | 5.56 | 10.8 |
| 3 | (A'-3) | 0 | 9.80 |

Hereinafter, the dispersants for carbon materials containing the copolymers (A-1) to (A-20) are referred to as "dispersants" (A-1) to (A-20), respectively, and the dispersants for carbon materials containing the comparative copolymers (A'-1) to (A'-3) are referred to as "comparative dispersants" (A'-1) to (A'-3), respectively.

Evaluation of Dispersibility of Carbon Material

Slurry for Dispersibility Evaluation

Example 1

The dispersant (A-1) (0.05 parts by weight) obtained by the above production method and carbon nanotubes (VGCF-H available from Showa Denko K.K.) (CNT) (1 part by weight) were fed into a polypropylene container with butyl butyrate (99 parts by weight) as a dispersion medium.

The mixture in this container was stirred for 1 minute using an ultrasonic disperser (UH-50 available from SMT Co., Ltd.), whereby a slurry (B-1) for dispersibility evaluation was produced.

Examples 2 to 43

Slurries (B-2) to (B-43) for dispersibility evaluation were obtained as in Example 1, using the components in the amounts shown in Table 3.

The parts by weight of each of the copolymers (A) in Tables 3 to 6 are the parts by weight in terms of solids.

Comparative Examples 1 to 3

Comparative slurries (B'-1) to (B'-3) for dispersibility evaluation were obtained as in Example 1, using the components in the amounts shown in Table 3.

Evaluation of Dispersibility in Solvent

The slurries (B-1) to (B-43) for dispersibility evaluation and the comparative slurries (B'-1) to (B'-3) for dispersibility evaluation obtained above were fed into glass sample containers, and the presence of precipitates after the slurries were left to stand for 30 minutes at room temperature was visually observed. Table 3 shows the results.

TABLE 3

| Example | Slurry for dispersibility evaluation | Copolymer (A) | Parts by weight of copolymer (A) | Solvent | Parts by weight of solvent | Carbon material Conductive additive | Parts by weight | Dispersion state after 30 min |
|---|---|---|---|---|---|---|---|---|
| 1 | (B-1) | (A-1) | 0.05 | Butyl butyrate | 99 | CNT | 1 | Not precipitated |
| 2 | (B-2) | (A-2) | 0.05 | Butyl butyrate | 99 | CNT | 1 | Not precipitated |
| 3 | (B-3) | (A-3) | 0.05 | Butyl butyrate | 99 | CNT | 1 | Not precipitated |
| 4 | (B-4) | (A-4) | 0.05 | Butyl butyrate | 99 | CNT | 1 | Not precipitated |
| 5 | (B-5) | (A-5) | 0.05 | Butyl butyrate | 99 | CNT | 1 | Not precipitated |
| 6 | (B-6) | (A-6) | 0.05 | Butyl butyrate | 99 | CNT | 1 | Not precipitated |
| 7 | (B-7) | (A-7) | 0.05 | Butyl butyrate | 99 | CNT | 1 | Not precipitated |
| 8 | (B-8) | (A-8) | 0.05 | Butyl butyrate | 99 | CNT | 1 | Not precipitated |
| 9 | (B-9) | (A-9) | 0.05 | Butyl butyrate | 99 | CNT | 1 | Not precipitated |
| 10 | (B-10) | (A-10) | 0.05 | Butyl butyrate | 99 | CNT | 1 | Not precipitated |
| 11 | (B-11) | (A-11) | 0.05 | Butyl butyrate | 99 | CNT | 1 | Not precipitated |
| 12 | (B-12) | (A-12) | 0.05 | Butyl butyrate | 99 | CNT | 1 | Not precipitated |
| 13 | (B-13) | (A-13) | 0.05 | Butyl butyrate | 99 | CNT | 1 | Not precipitated |
| 14 | (B-14) | (A-14) | 0.05 | Butyl butyrate | 99 | CNT | 1 | Not precipitated |
| 15 | (B-15) | (A-15) | 0.05 | Butyl butyrate | 99 | CNT | 1 | Not precipitated |
| 16 | (B-16) | (A-16) | 0.05 | Butyl butyrate | 99 | CNT | 1 | Not precipitated |
| 17 | (B-17) | (A-17) | 0.05 | Butyl butyrate | 99 | CNT | 1 | Not precipitated |
| 18 | (B-18) | (A-18) | 0.05 | Butyl butyrate | 99 | CNT | 1 | Not precipitated |
| 19 | (B-19) | (A-19) | 0.05 | Butyl butyrate | 99 | CNT | 1 | Not precipitated |
| 20 | (B-20) | (A-20) | 0.05 | Butyl butyrate | 99 | CNT | 1 | Not precipitated |
| 21 | (B-21) | (A-1) | 0.05 | Heptane | 99 | CNT | 1 | Not precipitated |
| 22 | (B-22) | (A-1) | 0.05 | Toluene | 99 | CNT | 1 | Not precipitated |
| 23 | (B-23) | (A-1) | 0.05 | Dibutyl ether | 99 | CNT | 1 | Not precipitated |

TABLE 3-continued

| | | | | | | | | |
|---|---|---|---|---|---|---|---|---|
| 24 | (B-24) | (A-1) | 0.05 | Carbon tetrachloride | 99 | CNT | 1 | Not precipitated |
| 25 | (B-25) | (A-1) | 0.05 | Paraffin | 99 | CNT | 1 | Not precipitated |
| 26 | (B-26) | (A-5) | 0.05 | Heptane | 99 | CNT | 1 | Not precipitated |
| 27 | (B-27) | (A-5) | 0.05 | Toluene | 99 | CNT | 1 | Not precipitated |
| 28 | (B-28) | (A-5) | 0.05 | Dibutyl ether | 99 | CNT | 1 | Not precipitated |
| 29 | (B-29) | (A-5) | 0.05 | Carbon tetrachloride | 99 | CNT | 1 | Not precipitated |
| 30 | (B-30) | (A-5) | 0.05 | Paraffin | 99 | CNT | 1 | Not precipitated |
| 31 | (B-31) | (A-9) | 0.05 | Heptane | 99 | CNT | 1 | Not precipitated |
| 32 | (B-32) | (A-9) | 0.05 | Toluene | 99 | CNT | 1 | Not precipitated |
| 33 | (B-33) | (A-9) | 0.05 | Dibutyl ether | 99 | CNT | 1 | Not precipitated |
| 34 | (B-34) | (A-9) | 0.05 | Carbon tetrachloride | 99 | CNT | 1 | Not precipitated |
| 35 | (B-35) | (A-9) | 0.05 | Paraffin | 99 | CNT | 1 | Not precipitated |
| 36 | (B-36) | (A-17) | 0.05 | Heptane | 99 | CNT | 1 | Not precipitated |
| 37 | (B-37) | (A-17) | 0.05 | Toluene | 99 | CNT | 1 | Not precipitated |
| 38 | (B-38) | (A-17) | 0.05 | Dibutyl ether | 99 | CNT | 1 | Not precipitated |
| 39 | (B-39) | (A-17) | 0.05 | Carbon tetrachloride | 99 | CNT | 1 | Not precipitated |
| 40 | (B-40) | (A-17) | 0.05 | Paraffin | 99 | CNT | 1 | Not precipitated |
| 41 | (B-41) | (A-1) | 0.05 | Butyl butyrate | 99 | AB | 1 | Not precipitated |
| 42 | (B-42) | (A-1) | 0.05 | Butyl butyrate | 99 | Natural graphite | 1 | Not precipitated |
| 43 | (B-43) | (A-1) | 0.05 | Butyl butyrate | 99 | CB | 1 | Not precipitated |

| Comparative example | Comparative slurry for evaluation of dispersion | Comparative copolymer (A') | Parts by weight of comparative copolymer (A') | Solvent | Parts by weight of solvent | Carbon material Conductive additive | Parts by weight | Dispersion state after 30 min |
|---|---|---|---|---|---|---|---|---|
| 1 | (B'-1) | (A'-1) | 0.05 | Butyl butyrate | 99 | CNT | 1 | Precipitated |
| 2 | (B'-2) | (A'-2) | 0.05 | Butyl butyrate | 99 | CNT | 1 | Precipitated |
| 3 | (B'-3) | (A'-3) | 0.05 | Butyl butyrate | 99 | CNT | 1 | Precipitated |

Evaluation of Dispersibility in Resin

Example 44

The dispersant (A-1) (0.05 parts by weight) obtained by the above production method and carbon nanotubes (VGCF-H available from Showa Denko K.K.) (CNT) (0.5 parts by weight) were fed into a polypropylene container with butyl butyrate (85 parts by weight) as a dispersion medium and polybutadiene (10 parts by weight).

The mixture in this container was stirred for 1 minute using an ultrasonic disperser (UH-50 available from SMT Co., Ltd.), whereby a slurry (B-44) for dispersibility evaluation was produced.

Examples 45 to 74

Slurries (B-45) to (B-74) for dispersibility evaluation were obtained as in Example 44, using the components in the amounts shown in Table 4.

Comparative Examples 4 to 11

Comparative slurries (B'-4) to (B'-11) for dispersibility evaluation were obtained as in Example 44, using the components in the amounts shown in Table 4.

Dispersibility Evaluation

The slurries (B-44) to (B-74) for dispersibility evaluation and the comparative slurries (B'-4) to (B'-11) for dispersibility evaluation obtained above were fed into glass sample containers, and the presence of agglomerates after the slurries were left to stand for 30 minutes at room temperature was visually observed. Table 4 shows the results.

TABLE 4

| Example | Slurry for dispersibility evaluation | Copolymer (A) | Parts by weight of copolymer (A) | Solvent | Parts by weight of solvent |
|---|---|---|---|---|---|
| 44 | (B-44) | (A-1) | 0.05 | Butyl butyrate | 85 |
| 45 | (B-45) | (A-1) | 0.05 | Butyl butyrate | 85 |
| 46 | (B-46) | (A-1) | 0.05 | Butyl butyrate | 85 |
| 47 | (B-47) | (A-1) | 0.05 | Butyl butyrate | 85 |
| 48 | (B-48) | (A-1) | 0.5 | — | — |
| 49 | (B-49) | (A-1) | 0.5 | — | — |
| 50 | (B-50) | (A-1) | 0.5 | — | — |
| 51 | (B-51) | (A-1) | 0.5 | — | — |
| 52 | (B-52) | (A-1) | 0.05 | Toluene | 85 |
| 53 | (B-53) | (A-1) | 0.05 | Heptane | 85 |
| 54 | (B-54) | (A-1) | 0.05 | Paraffin | 85 |
| 55 | (B-55) | (A-1) | 0.05 | Ethyl acetate | 85 |
| 56 | (B-56) | (A-5) | 0.05 | Butyl butyrate | 85 |
| 57 | (B-57) | (A-5) | 0.05 | Toluene | 85 |
| 58 | (B-58) | (A-5) | 0.05 | Heptane | 85 |
| 59 | (B-59) | (A-5) | 0.05 | Paraffin | 85 |
| 60 | (B-60) | (A-5) | 0.05 | Ethyl acetate | 85 |
| 61 | (B-61) | (A-9) | 0.05 | Butyl butyrate | 85 |
| 62 | (B-62) | (A-9) | 0.05 | Toluene | 85 |
| 63 | (B-63) | (A-9) | 0.05 | Heptane | 85 |
| 64 | (B-64) | (A-9) | 0.05 | Paraffin | 85 |
| 65 | (B-65) | (A-9) | 0.05 | Ethyl acetate | 85 |
| 66 | (B-66) | (A-17) | 0.05 | Butyl butyrate | 85 |

TABLE 4-continued

| | | | | | |
|---|---|---|---|---|---|
| 67 | (B-67) | (A-17) | 0.05 | Toluene | 85 |
| 68 | (B-68) | (A-17) | 0.05 | Heptane | 85 |
| 69 | (B-69) | (A-17) | 0.05 | Paraffin | 85 |
| 70 | (B-70) | (A-17) | 0.05 | Ethyl acetate | 85 |
| 71 | (B-71) | (A-1) | 0.5 | — | — |
| 72 | (B-72) | (A-1) | 0.5 | — | — |
| 73 | (B-73) | (A-1) | 0.5 | — | — |
| 74 | (B-74) | (A-1) | 0.5 | — | — |

| Example | Resin | Parts by weight of resin | Carbon material Conductive additive | Parts by weight | Dispersion state after 30 min |
|---|---|---|---|---|---|
| 44 | Polybutadiene | 10 | CNT | 0.5 | Not precipitated |
| 45 | Styrene butadiene rubber | 10 | CNT | 0.5 | Not precipitated |
| 46 | Polypropylene | 10 | CNT | 0.5 | Not precipitated |
| 47 | Polyisoprene | 10 | CNT | 0.5 | Not precipitated |
| 48 | Polybutadiene | 100 | CNT | 5 | Not precipitated |
| 49 | Styrene butadiene rubber | 100 | CNT | 5 | Not precipitated |
| 50 | Polypropylene | 100 | CNT | 5 | Not precipitated |
| 51 | Polyisoprene | 100 | CNT | 5 | Not precipitated |
| 52 | Polybutadiene | 10 | AB | 0.5 | Not precipitated |
| 53 | Styrene butadiene rubber | 10 | Natural graphite | 0.5 | Not precipitated |
| 54 | Polypropylene | 10 | CB | 0.5 | Not precipitated |
| 55 | Polyisoprene | 10 | CF | 0.5 | Not precipitated |
| 56 | Polybutadiene | 10 | CNT | 0.5 | Not precipitated |
| 57 | Polybutadiene | 10 | AB | 0.5 | Not precipitated |
| 58 | Styrene butadiene rubber | 10 | Natural graphite | 0.5 | Not precipitated |
| 59 | Polypropylene | 10 | CB | 0.5 | Not precipitated |
| 60 | Polyisoprene | 10 | CF | 0.5 | Not precipitated |
| 61 | Polybutadiene | 10 | CNT | 0.5 | Not precipitated |
| 62 | Polybutadiene | 10 | AB | 0.5 | Not precipitated |
| 63 | Styrene butadiene rubber | 10 | Natural graphite | 0.5 | Not precipitated |
| 64 | Polypropylene | 10 | CB | 0.5 | Not precipitated |
| 65 | Polyisoprene | 10 | CF | 0.5 | Not precipitated |
| 66 | Polybutadiene | 10 | CNT | 0.5 | Not precipitated |
| 67 | Polybutadiene | 10 | AB | 0.5 | Not precipitated |
| 68 | Styrene butadiene rubber | 10 | Natural graphite | 0.5 | Not precipitated |
| 69 | Polypropylene | 10 | CB | 0.5 | Not precipitated |
| 70 | Polyisoprene | 10 | CF | 0.5 | Not precipitated |
| 71 | Polybutadiene | 100 | AB | 5 | Not precipitated |
| 72 | Styrene butadiene rubber | 100 | Natural graphite | 5 | Not precipitated |

TABLE 4-continued

| | | | | | |
|---|---|---|---|---|---|
| 73 | Polypropylene | 100 | CB | 5 | Not precipitated |
| 74 | Polyisoprene | 100 | CF | 5 | Not precipitated |

| Comparative example | Comparative slurry for evaluation of (A') | Comparative copolymer (A') | Parts by weight of comparative copolymer (A') | Solvent | Parts by weight of solvent |
|---|---|---|---|---|---|
| 4 | (B'-4) | (A'-1) | 0.05 | Butyl butyrate | 85 |
| 5 | (B'-5) | (A'-2) | 0.05 | Butyl butyrate | 85 |
| 6 | (B'-6) | (A'-3) | 0.05 | Butyl butyrate | 85 |
| 7 | (B'-7) | (A'-1) | 0.05 | Butyl butyrate | 85 |
| 8 | (B'-8) | (A'-1) | 0.5 | — | — |
| 9 | (B'-9) | (A'-1) | 0.5 | — | — |
| 10 | (B'-10) | (A'-1) | 0.5 | — | — |
| 11 | (B'-11) | (A'-1) | 0.5 | — | — |

| Comparative example | Resin | Parts by weight of resin | Carbon material Conductive additive | Parts by weight | Dispersion state after 30 min |
|---|---|---|---|---|---|
| 4 | Polybutadiene | 10 | CNT | 0.5 | Precipitated |
| 5 | Styrene butadiene rubber | 10 | AB | 0.5 | Precipitated |
| 6 | Polypropylene | 10 | Natural graphite | 0.5 | Precipitated |
| 7 | Polyisoprene | 10 | CF | 0.5 | Precipitated |
| 8 | Polybutadiene | 100 | CNT | 5 | Precipitated |
| 9 | Styrene butadiene rubber | 100 | AB | 5 | Precipitated |
| 10 | Polypropylene | 100 | Natural graphite | 5 | Precipitated |
| 11 | Polyisoprene | 100 | CF | 5 | Precipitated |

Production of Li—P—S Solid Electrolyte

A Li—P—S solid electrolyte was produced according to the method disclosed in WO 2015/115561. Specifically, lithium sulfide ($Li_2S$ available from Aldrich, purity>99.98%) (2.42 g) and diphosphorus pentasulfide ($P_2S_5$ available from Aldrich, purity>99%) (3.90 g) were weighed out in a glovebox under an argon atmosphere (dew point–70° C.), and placed in an agate mortar, followed by mixing with an agate pestle for 5 minutes. The mole ratio of $Li_2S$ to $P_2S_5$ was 75:25 ($Li_2S:P_2S_5$).

Zirconia beads (66 g) each having a diameter of 5 mm were placed in a 45-mL zirconia container (Fritsch), and the whole amount of the mixture of lithium sulfide and diphosphorus pentasulfide was added thereto. The container was completely sealed under an argon atmosphere. The container was set in a planetary ball mill "P-7" (Fritsch) for mechanical milling at a temperature of 25° C. and a rotational speed of 510 rpm for 20 hours, whereby a sulfide solid electrolyte material in the form of yellow powder (Li—P—S glass, hereinafter also referred to as "$75Li_2S.25P_2S_5$") (6.20 g) was obtained.

Preparation of Positive Electrode Slurry for All-Solid Lithium Ion Secondary Battery (Also Referred to as "Positive Electrode Slurry") and Positive Electrode for Battery Evaluation Example 75

$LiNi_{1/3}Mn_{1/3}Co_{1/3}O_2$ (also referred to as "NCM" available from Sigma-Aldrich) having an average particle size of 6 μm as a positive electrode active material, $75Li_2S.25P_2S_5$ produced above as a sulfide solid electrolyte, PVDF as a binder, carbon nanotubes (VGCF-H available from Showa Denko K.K.) (CNT) as a conductive additive, butyl butyrate as a dispersion medium, and the dispersant (A-1) in amounts (parts by weight) in accordance with Table 5 were placed in a polypropylene container.

The mixture in the container was stirred for 30 seconds using an ultrasonic disperser (UH-50 available from SMT Co., Ltd.), and then the container was shaken for 3 minutes using a shaker (TTM-1 available from Shibata Scientific Technology Ltd.). Further, the mixture in this container was stirred for 30 seconds using an ultrasonic disperser, and then the container was shaken for 3 minutes using a shaker, whereby a positive electrode slurry (C-1) was obtained.

Examples 76 to 95 and Comparative Examples 12 to 14

Positive electrode slurries (C-2) to (C-21) and comparative positive electrode slurries (C'-1) to (C'-3) were obtained as in Example 75.

TABLE 5

| Example | Positive electrode slurry (C) | Copolymer (A) Type | Parts by weight | Dispersion medium Type | Parts by weight | Binder Type | Parts by weight |
|---|---|---|---|---|---|---|---|
| 75 | (C-1) | (A-1) | 0.3 | Butyl butyrate | 46.2 | PVDF | 1.5 |
| 76 | (C-2) | (A-2) | 0.3 | Butyl butyrate | 46.2 | PVDF | 1.5 |
| 77 | (C-3) | (A-3) | 0.3 | Butyl butyrate | 46.2 | PVDF | 1.5 |
| 78 | (C-4) | (A-4) | 0.3 | Butyl butyrate | 46.2 | PVDF | 1.5 |
| 79 | (C-5) | (A-5) | 0.3 | Butyl butyrate | 46.2 | PVDF | 1.5 |
| 80 | (C-6) | (A-6) | 0.3 | Butyl butyrate | 46.2 | PVDF | 1.5 |
| 81 | (C-7) | (A-7) | 0.3 | Butyl butyrate | 46.2 | PVDF | 1.5 |
| 82 | (C-8) | (A-8) | 0.3 | Butyl butyrate | 46.2 | PVDF | 1.5 |
| 83 | (C-9) | (A-9) | 0.3 | Butyl butyrate | 46.2 | PVDF | 1.5 |
| 84 | (C-10) | (A-10) | 0.3 | Butyl butyrate | 46.2 | PVDF | 1.5 |
| 85 | (C-11) | (A-11) | 0.3 | Butyl butyrate | 46.2 | PVDF | 1.5 |
| 86 | (C-12) | (A-12) | 0.3 | Butyl butyrate | 46.2 | PVDF | 1.5 |
| 87 | (C-13) | (A-13) | 0.3 | Butyl butyrate | 46.2 | PVDF | 1.5 |
| 88 | (C-14) | (A-14) | 0.3 | Butyl butyrate | 46.2 | PVDF | 1.5 |
| 89 | (C-15) | (A-15) | 0.3 | Butyl butyrate | 46.2 | PVDF | 1.5 |
| 90 | (C-16) | (A-16) | 0.3 | Butyl butyrate | 46.2 | PVDF | 1.5 |
| 91 | (C-17) | (A-17) | 0.3 | Butyl butyrate | 47.2 | PVDF | 1.5 |
| 92 | (C-18) | (A-18) | 0.3 | Butyl butyrate | 48.2 | PVDF | 1.5 |
| 93 | (C-19) | (A-19) | 0.3 | Butyl butyrate | 46.2 | PVDF | 1.5 |
| 94 | (C-20) | (A-20) | 0.3 | Butyl butyrate | 46.2 | PVDF | 1.5 |
| 95 | (C-21) | (A-5) | 1.8 | Butyl butyrate | 46.2 | PVDF | 0 |

| Example | Positive electrode active material Type | Parts by weight | Solid electrolyte Type | Parts by weight | Carbon material Type | Parts by weight |
|---|---|---|---|---|---|---|
| 75 | NCM | 75 | $75Li_2S \cdot 25P_2S_5$ | 25 | CNT | 6 |
| 76 | NCM | 75 | $75Li_2S \cdot 25P_2S_5$ | 25 | CNT | 6 |
| 77 | NCM | 75 | $75Li_2S \cdot 25P_2S_5$ | 25 | CNT | 6 |
| 78 | NCM | 75 | $75Li_2S \cdot 25P_2S_5$ | 25 | CNT | 6 |
| 79 | NCM | 75 | $75Li_2S \cdot 25P_2S_5$ | 25 | CNT | 6 |
| 80 | NCM | 75 | $75Li_2S \cdot 25P_2S_5$ | 25 | CNT | 6 |
| 81 | NCM | 75 | $75Li_2S \cdot 25P_2S_5$ | 25 | CNT | 6 |
| 82 | NCM | 75 | $75Li_2S \cdot 25P_2S_5$ | 25 | CNT | 6 |
| 83 | NCM | 75 | $75Li_2S \cdot 25P_2S_5$ | 25 | CNT | 6 |
| 84 | NCM | 75 | $75Li_2S \cdot 25P_2S_5$ | 25 | CNT | 6 |
| 85 | NCM | 75 | $75Li_2S \cdot 25P_2S_5$ | 25 | CNT | 6 |
| 86 | NCM | 75 | $75Li_2S \cdot 25P_2S_5$ | 25 | CNT | 6 |
| 87 | NCM | 75 | $75Li_2S \cdot 25P_2S_5$ | 25 | CNT | 6 |
| 88 | NCM | 75 | $75Li_2S \cdot 25P_2S_5$ | 25 | CNT | 6 |
| 89 | NCM | 75 | $75Li_2S \cdot 25P_2S_5$ | 25 | CNT | 6 |

TABLE 5-continued

| | | | | | | |
|---|---|---|---|---|---|---|
| 90 | NCM | 75 | 75Li$_2$S·25P$_2$S$_5$ | 25 | CNT | 6 |
| 91 | NCM | 76 | 75Li$_2$S·25P$_2$S$_5$ | 26 | CNT | 6 |
| 92 | NCM | 77 | 75Li$_2$S·25P$_2$S$_5$ | 27 | CNT | 6 |
| 93 | NCM | 75 | 75Li$_2$S·25P$_2$S$_5$ | 25 | CNT | 6 |
| 94 | NCM | 75 | 75Li$_2$S·25P$_2$S$_5$ | 25 | CNT | 6 |
| 95 | NCM | 75 | 75Li$_2$S·25P$_2$S$_5$ | 25 | CNT | 6 |

| Comparative example | Comparative positive electrode slurry (C') | Comparative copolymer (A') Type | Parts by weight | Dispersion medium Type | Parts by weight | Binder Type | Parts by weight |
|---|---|---|---|---|---|---|---|
| 12 | (C'-1) | (A'-1) | 0.3 | Butyl butyrate | 46.2 | PVDF | 1.5 |
| 13 | (C'-2) | (A'-2) | 0.3 | Butyl butyrate | 46.2 | PVDF | 1.5 |
| 14 | (C'-3) | (A'-3) | 0.3 | Butyl butyrate | 46.2 | PVDF | 1.5 |

| Comparative example | Positive electrode active material Type | Parts by weight | Solid electrolyte Type | Parts by weight | Carbon material Type | Parts by weight |
|---|---|---|---|---|---|---|
| 12 | NCM | 75 | 75Li$_2$S·25P$_2$S$_5$ | 25 | CNT | 6 |
| 13 | NCM | 75 | 75Li$_2$S·25P$_2$S$_5$ | 25 | CNT | 6 |
| 14 | NCM | 75 | 75Li$_2$S·25P$_2$S$_5$ | 25 | CNT | 6 |

The positive electrode slurries (C-1) to (C-21) and the comparative positive electrode slurries (C'-1) to (C'-3) were applied by the blade method using an applicator to carbon-coated aluminum foil as a current collector.

The slurries applied to the aluminum foil were dried naturally, and then dried on a 100° C. hot plate for 30 minutes, whereby positive electrodes (E-1) to (E-21) and comparative positive electrodes (E'-1) to (E'-3) were produced.

Preparation of Negative Electrode Slurry for All-Solid Lithium Ion Secondary Battery (Also Referred to as "Negative Electrode Slurry") and Negative Electrode for Battery Evaluation Example 96

Natural graphite carbon (Mitsubishi Chemical Corporation) having an average particle size of 10 μm as a negative electrode active material, 75Li$_2$S.25P$_2$S$_5$ as a sulfide solid electrolyte, a binder, and the dispersant (A-1) in amounts (parts by weight) in accordance with Table 6 were placed in a polypropylene container.

The mixture in the container was stirred for 30 seconds using an ultrasonic disperser (UH-50 available from SMT Co., Ltd.), and then the container was shaken for 30 minutes using a shaker (TTM-1 available from Shibata Scientific Technology Ltd.), whereby a negative electrode slurry (D-1) was obtained.

Examples 97 to 116 and Comparative Examples 15 to 17

Negative electrode slurries (D-2) to (D-21) and comparative negative electrode slurries (D'-1) to (D'-3) were obtained as in Example 96.

TABLE 6

| Example | Negative electrode slurry (D) | Copolymer (A) Type | Parts by weight | Dispersion medium Type | Parts by weight | Binder Type | Parts by weight |
|---|---|---|---|---|---|---|---|
| 96 | (D-1) | (A-1) | 0.4 | Butyl butyrate | 121 | PVDF | 2 |
| 97 | (D-2) | (A-2) | 0.4 | Butyl butyrate | 121 | PVDF | 2 |
| 98 | (D-3) | (A-3) | 0.4 | Butyl butyrate | 121 | PVDF | 2 |
| 99 | (D-4) | (A-4) | 0.4 | Butyl butyrate | 121 | PVDF | 2 |
| 100 | (D-5) | (A-5) | 0.4 | Butyl butyrate | 121 | PVDF | 2 |
| 101 | (D-6) | (A-6) | 0.4 | Butyl butyrate | 121 | PVDF | 2 |
| 102 | (D-7) | (A-7) | 0.4 | Butyl butyrate | 121 | PVDF | 2 |

TABLE 6-continued

| | | | | | | | |
|---|---|---|---|---|---|---|---|
| 103 | (D-8) | (A-8) | 0.4 | Butyl butyrate | 121 | PVDF | 2 |
| 104 | (D-9) | (A-9) | 0.4 | Butyl butyrate | 121 | PVDF | 2 |
| 105 | (D-10) | (A-10) | 0.4 | Butyl butyrate | 121 | PVDF | 2 |
| 106 | (D-11) | (A-11) | 0.4 | Butyl butyrate | 121 | PVDF | 2 |
| 107 | (D-12) | (A-12) | 0.4 | Butyl butyrate | 121 | PVDF | 2 |
| 108 | (D-13) | (A-13) | 0.4 | Butyl butyrate | 121 | PVDF | 2 |
| 109 | (D-14) | (A-14) | 0.4 | Butyl butyrate | 121 | PVDF | 2 |
| 110 | (D-15) | (A-15) | 0.4 | Butyl butyrate | 121 | PVDF | 2 |
| 111 | (D-16) | (A-16) | 0.4 | Butyl butyrate | 121 | PVDF | 2 |
| 112 | (D-17) | (A-17) | 0.4 | Butyl butyrate | 121 | PVDF | 2 |
| 113 | (D-18) | (A-18) | 0.4 | Butyl butyrate | 121 | PVDF | 2 |
| 114 | (D-19) | (A-19) | 0.4 | Butyl butyrate | 121 | PVDF | 2 |
| 115 | (D-20) | (A-20) | 0.4 | Butyl butyrate | 121 | PVDF | 2 |
| 116 | (D-21) | (A-5) | 2.4 | Butyl butyrate | 121 | PVDF | 0 |

| Example | Negative electrode active material Type | Parts by weight | Solid electrolyte Type | Parts by weight | Carbon material Type | Parts by weight |
|---|---|---|---|---|---|---|
| 96 | Natural graphite | 100 | $75Li_2S \cdot 25P_2S_5$ | 71 | CNT | 8 |
| 97 | Natural graphite | 100 | $75Li_2S \cdot 25P_2S_5$ | 71 | CNT | 8 |
| 98 | Natural graphite | 100 | $75Li_2S \cdot 25P_2S_5$ | 71 | CNT | 8 |
| 99 | Natural graphite | 100 | $75Li_2S \cdot 25P_2S_5$ | 71 | CNT | 8 |
| 100 | Natural graphite | 100 | $75Li_2S \cdot 25P_2S_5$ | 71 | CNT | 8 |
| 101 | Natural graphite | 100 | $75Li_2S \cdot 25P_2S_5$ | 71 | CNT | 8 |
| 102 | Natural graphite | 100 | $75Li_2S \cdot 25P_2S_5$ | 71 | CNT | 8 |
| 103 | Natural graphite | 100 | $75Li_2S \cdot 25P_2S_5$ | 71 | CNT | 8 |
| 104 | Natural graphite | 100 | $75Li_2S \cdot 25P_2S_5$ | 71 | CNT | 8 |
| 105 | Natural graphite | 100 | $75Li_2S \cdot 25P_2S_5$ | 71 | CNT | 8 |
| 106 | Natural graphite | 100 | $75Li_2S \cdot 25P_2S_5$ | 71 | CNT | 8 |
| 107 | Natural graphite | 100 | $75Li_2S \cdot 25P_2S_5$ | 71 | CNT | 8 |
| 108 | Natural graphite | 100 | $75Li_2S \cdot 25P_2S_5$ | 71 | CNT | 8 |
| 109 | Natural graphite | 100 | $75Li_2S \cdot 25P_2S_5$ | 71 | CNT | 8 |
| 110 | Natural graphite | 100 | $75Li_2S \cdot 25P_2S_5$ | 71 | CNT | 8 |
| 111 | Natural graphite | 100 | $75Li_2S \cdot 25P_2S_5$ | 71 | CNT | 8 |
| 112 | Natural graphite | 100 | $75Li_2S \cdot 25P_2S_5$ | 71 | CNT | 8 |
| 113 | Natural graphite | 100 | $75Li_2S \cdot 25P_2S_5$ | 71 | CNT | 8 |
| 114 | Natural graphite | 100 | $75Li_2S \cdot 25P_2S_5$ | 71 | CNT | 8 |
| 115 | Natural graphite | 100 | $75Li_2S \cdot 25P_2S_5$ | 71 | CNT | 8 |
| 116 | Natural graphite | 100 | $75Li_2S \cdot 25P_2S_5$ | 71 | CNT | 8 |

TABLE 6-continued

| Comparative exmaple | Comparative positive electrode slurry (D') | Comparative copolymer (A') Type | Parts by weight | Dispersion medium Type | Parts by weight | Binder Type | Parts by weight |
|---|---|---|---|---|---|---|---|
| 15 | (D'-1) | (A'-1) | 0.4 | Butyl butyrate | 121 | PVDF | 2 |
| 16 | (D'-2) | (A'-2) | 0.4 | Butyl butyrate | 121 | PVDF | 2 |
| 17 | (D'-3) | (A'-3) | 0.4 | Butyl butyrate | 121 | PVDF | 2 |

| Comparative exmaple | Negative electrode active material Type | Parts by weight | Solid electrolyte Type | Parts by weight | Carbon material Type | Parts by weight |
|---|---|---|---|---|---|---|
| 15 | Natural graphite | 100 | 75Li$_2$S•25P$_2$S$_5$ | 71 | CNT | 8 |
| 16 | Natural graphite | 100 | 75Li$_2$S•25P$_2$S$_5$ | 71 | CNT | 8 |
| 17 | Natural graphite | 100 | 75Li$_2$S•25P$_2$S$_5$ | 71 | CNT | 8 |

The negative electrode slurries (D-1) to (D-21) and the comparative negative electrode slurries (D'-1) to (D'-3) were applied by the blade method using an applicator to copper foil as a current collector.

The slurries applied to the copper foil was dried naturally, and then dried on a 100° C. hot plate for 30 minutes, whereby negative electrodes (F-1) to (F-21) and comparative negative electrodes (F'-1) to (F'-3) were produced.

Production of All-Solid Lithium Ion Secondary Battery

Example 117

75Li$_2$S.25P$_2$S$_5$ as a sulfide solid electrolyte, a 5 mass % solution of a butadiene rubber as a binder in butyl butyrate, and a dispersant were placed in a polypropylene container.

The mixture in this container was stirred for 30 seconds using an ultrasonic disperser (UH-50 available from SMT Co., Ltd.), and then the container was shaken for 30 minutes using a shaker (TTM-1 available from Shibata Scientific Technology Ltd.), whereby a slurry was obtained.

The obtained slurry was applied by the blade method using an applicator to a surface coated with the negative electrode slurry of the negative electrode (F-1), and the dispersion medium was dried by evaporation, whereby a solid electrolyte layer was obtained.

The negative electrode (F-1) including a solid electrolyte layer obtained above was introduced into a mold having an area of 1 cm$^2$, and pressed at 10.0×10$^7$ Pa to produce a separate layer formed of the solid electrolyte layer on the negative electrode (F-1). The positive electrode (E-1) was overlaid on one side of the separate layer, and pressed at 10.0×10$^7$ Pa, whereby an all-solid lithium ion battery (G-1) was produced.

Examples 118 to 137 and Comparative Examples 18 to 20

All-solid lithium ion batteries (G-2) to (G-21) and comparative all-solid lithium ion batteries (G'-1) to (G'-3) were produced as in Example 117, using positive electrodes and negative electrode shown in Table 7.

Evaluation of Battery Characteristics

Each battery was charged at 0.8 mA (termination current: 0.016 mA) to 4.1 V and discharged at 0.5 mA (termination current: 0.016 mA) to 3 V. This charging/discharging was regarded as one cycle, and the discharge capacity in the first cycle was regarded as the initial battery capacity. Subsequently, the battery was charged to 3.7 V, and the initial battery resistance was determined from the amount of voltage drop 5 seconds after discharging at 4.8 mA.

Then, each battery was charged at 0.8 mA to 3.9 V, followed by a 10-minute pause, and was then discharged at 0.5 mA to 3 V. This charge/discharge cycle was repeated 100 times. The charge/discharge capacity in the 100th cycle of charging and discharging was regarded as the battery capacity after 100 cycles. Subsequently, the battery was charged to 3.7 V, and the resistance after 100 cycles was determined from the amount of voltage drop 5 seconds after discharging at 4.8 mA.

The capacity retention was calculated by substituting the initial battery capacity and the battery capacity after 100 cycles that were measured into the following formula. Capacity retention (%)=(Battery capacity after 100 cycles)/(initial battery capacity)×100

Table 7 below shows the results.

TABLE 7

| Example | Positive electrode (E) | Negative electrode (F) | Battery (G) | Capacity retention (%) | Initial battery resistance (Ω) | Battery resistance after 100 cycles (Ω) |
|---|---|---|---|---|---|---|
| 117 | (E-1) | (F-1) | (G-1) | 96.9 | 21.8 | 43.6 |
| 118 | (E-2) | (F-2) | (G-2) | 94.6 | 24.9 | 39.8 |
| 119 | (E-3) | (F-3) | (G-3) | 91 | 23.7 | 38.2 |
| 120 | (E-4) | (F-4) | (G-4) | 97.5 | 21.8 | 44.2 |
| 121 | (E-5) | (F-5) | (G-5) | 93.9 | 24.9 | 42.2 |
| 122 | (E-6) | (F-6) | (G-6) | 97.4 | 24.2 | 39.1 |
| 123 | (E-7) | (F-7) | (G-7) | 97.6 | 21.6 | 40.1 |
| 124 | (E-8) | (F-8) | (G-8) | 94.4 | 22.4 | 36.3 |
| 125 | (E-9) | (F-9) | (G-9) | 94.5 | 20.7 | 40.5 |
| 126 | (E-10) | (F-10) | (G-10) | 92.8 | 23.6 | 42.7 |
| 127 | (E-11) | (F-11) | (G-11) | 92.7 | 24.4 | 41.9 |
| 128 | (E-12) | (F-12) | (G-12) | 88.9 | 24.8 | 65.8 |
| 129 | (E-13) | (F-13) | (G-13) | 94 | 24.2 | 44.1 |
| 130 | (E-14) | (F-14) | (G-14) | 90.2 | 23 | 67.9 |
| 131 | (E-15) | (F-15) | (G-15) | 93 | 24.1 | 60.3 |
| 132 | (E-16) | (F-16) | (G-16) | 90.9 | 21 | 55.8 |
| 133 | (E-17) | (F-17) | (G-17) | 91 | 20.9 | 55 |
| 134 | (E-18) | (F-18) | (G-18) | 89.6 | 21.5 | 60.1 |
| 135 | (E-19) | (F-19) | (G-19) | 87.3 | 22.7 | 57.2 |
| 136 | (E-20) | (F-20) | (G-20) | 98 | 20.1 | 38.9 |
| 137 | (E-21) | (F-21) | (G-21) | 93 | 22.1 | 40.1 |

| Comparative example | Positive electrode (E') | Negative electrode (F') | Battery (G') | Capacity retention (%) | Initial battery resistance (Ω) | Battery resistace after 100 cycles (Ω) |
|---|---|---|---|---|---|---|
| 18 | (E'-1) | (F'-1) | (G'-1) | 76.5 | 31.4 | 99 |
| 19 | (E'-2) | (F'-2) | (G'-2) | 77.1 | 34.5 | 104.5 |
| 20 | (E'-3) | (F'-3) | (G'-3) | 80.3 | 32.2 | 104.1 |

INDUSTRIAL APPLICABILITY

Use of the dispersant for carbon materials of the present invention can increase affinity of a carbon material such as a conductive additive for low-polar solvents and low-polar media to reduce aggregation of the carbon material so as to improve the dispersion uniformity and dispersion stability of the carbon material in the low-polar solvents and low-polar media.

Thus, the all-solid lithium ion secondary battery including the dispersant for carbon materials of the present invention is excellent in high-current charge/discharge characteristics, cycle characteristics, and electrode conductivity, and is useful for battery power.

The invention claimed is:

1. A dispersion comprising:
   a dispersant for carbon materials;
   a carbon material; and
   a low-polar solvent having a dielectric constant of 1.5 or more and 6.4 or less and/or a low-polar medium that is a hydrocarbon resin having a dielectric constant of 1.5 or more and 6.4 or less;
   wherein the dispersant comprises a copolymer (A) containing a (meth)acrylic acid ester monomer (a) represented by the following formula (1) and a nitrogen-containing vinyl monomer (b),
   wherein the nitrogen-containing vinyl monomer (b) consists of at least one monomer (b1) represented by the following formula (2), with the proviso that N-vinylpyrrolidone is required in the monomer (b), and
   wherein the copolymer (A) has a nitrogen content of 0.01 wt % or more and 5 wt % or less, and the copolymer (A) has a solubility parameter value of 8.0 to 12.0 $(cal/cm^3)^{1/2}$:

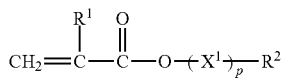
(1)

wherein $R^1$ is a hydrogen atom or a methyl group; $X^1$ is a C2-C4 oxyalkylene group; $R^2$ is a C8-C32 alkyl group when p=0, or a C1-C32 alkyl group when p=1 to 20; p is an integer of 0 to 20, and each $X^1$ may be the same or different when p is 2 or greater;

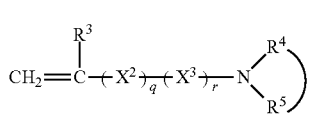
(2)

wherein $R^3$ is a hydrogen atom or a methyl group; $X^2$ is at least one group selected from the group consisting of an ester group, an amide group, a carbonyl group, and an aliphatic hydrocarbon group, and q is an integer of 0 or 1; $X^3$ is a C2-C4 alkylene group, and r is an integer of 0 or 1; $R^4$ and $R^5$ are C1-C4 hydrocarbon groups that may be the same or different from each other, and may be bonded together to form a ring; and when the amino group in the formula (2) is a cyclic amino group formed by bonding of $R^4$ and $R^5$, the cyclic amino group contains a C4-C5 hydrocarbon group and 0 to 2 carbonyl groups.

2. The dispersion according to claim 1,
   wherein the carbon material is at least one carbon material selected from the group consisting of graphite, carbon black (CB), carbon nanotube (CNT), carbon nanofiber (CNF), carbon fiber (CF), acetylene black (AB), fullerene, and natural graphite.

3. The dispersion according to claim 1,
wherein the nitrogen-containing vinyl monomer (b) contains at least two monomers (b1).

4. An electrode slurry for an all-solid lithium ion secondary battery, comprising:
the dispersion according to claim 1;
a solid electrolyte; and
a positive electrode active material or a negative electrode active material.

5. An electrode for an all-solid lithium ion secondary battery, comprising:
the dispersion according to claim 1;
a solid electrolyte; and
a positive electrode active material or a negative electrode active material.

6. An all-solid lithium ion secondary battery comprising:
the electrode for an all-solid lithium ion secondary battery according to claim 5.

7. A method of producing an electrode for an all-solid lithium ion secondary battery, comprising:
preparing the electrode slurry for an all-solid lithium ion secondary battery according to claim 4 by mixing the dispersion, the solid electrolyte, and the positive electrode active material or the negative electrode active material.

* * * * *